INVENTORS.
Raymond L. Ewald
Henry A. Skog
By Moore Olsen & Trexler
Attys.

Dec. 30, 1952 R. L. EWALD ET AL 2,623,564
FRUIT PITTING METHOD AND APPARATUS
Filed Nov. 8, 1945 6 Sheets-Sheet 4
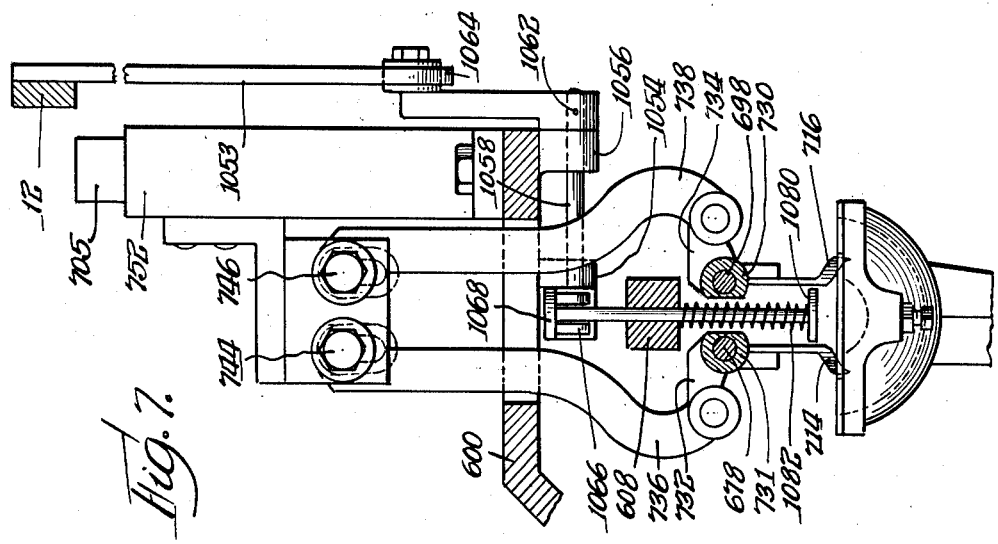
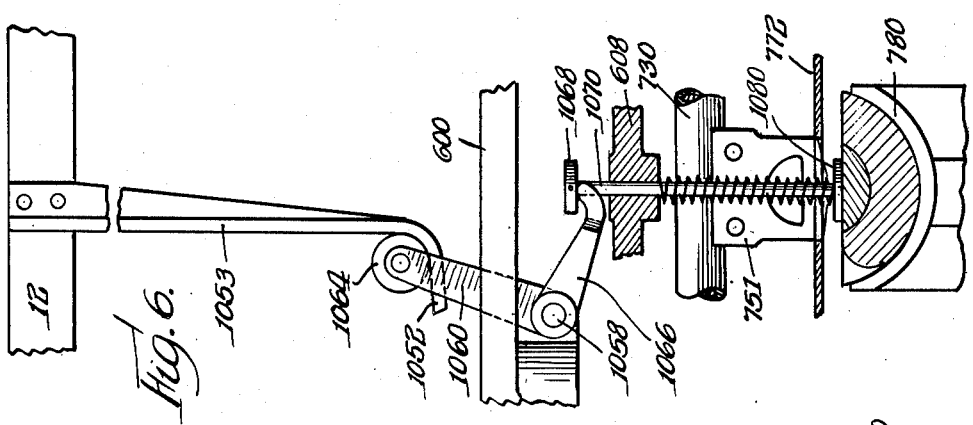
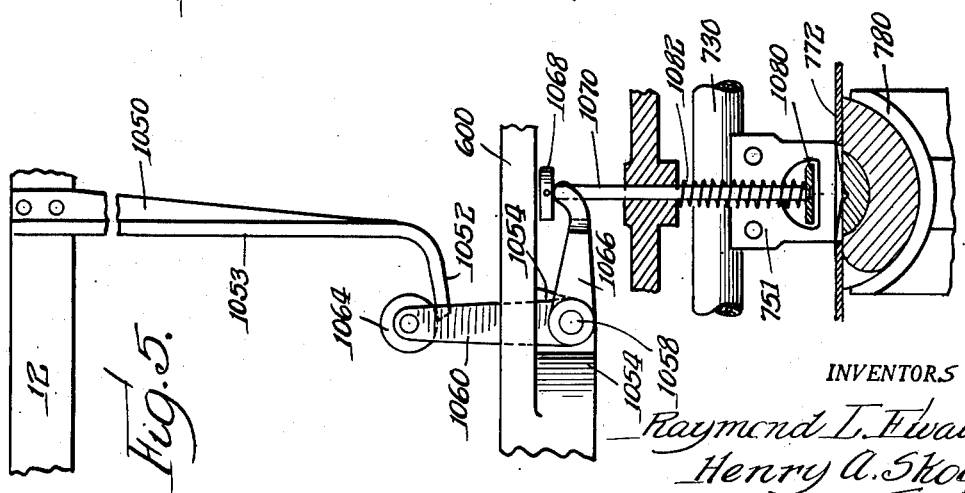
INVENTORS
Raymond L. Ewald
Henry A. Skog
By: Mooie Olson & Tredler attys

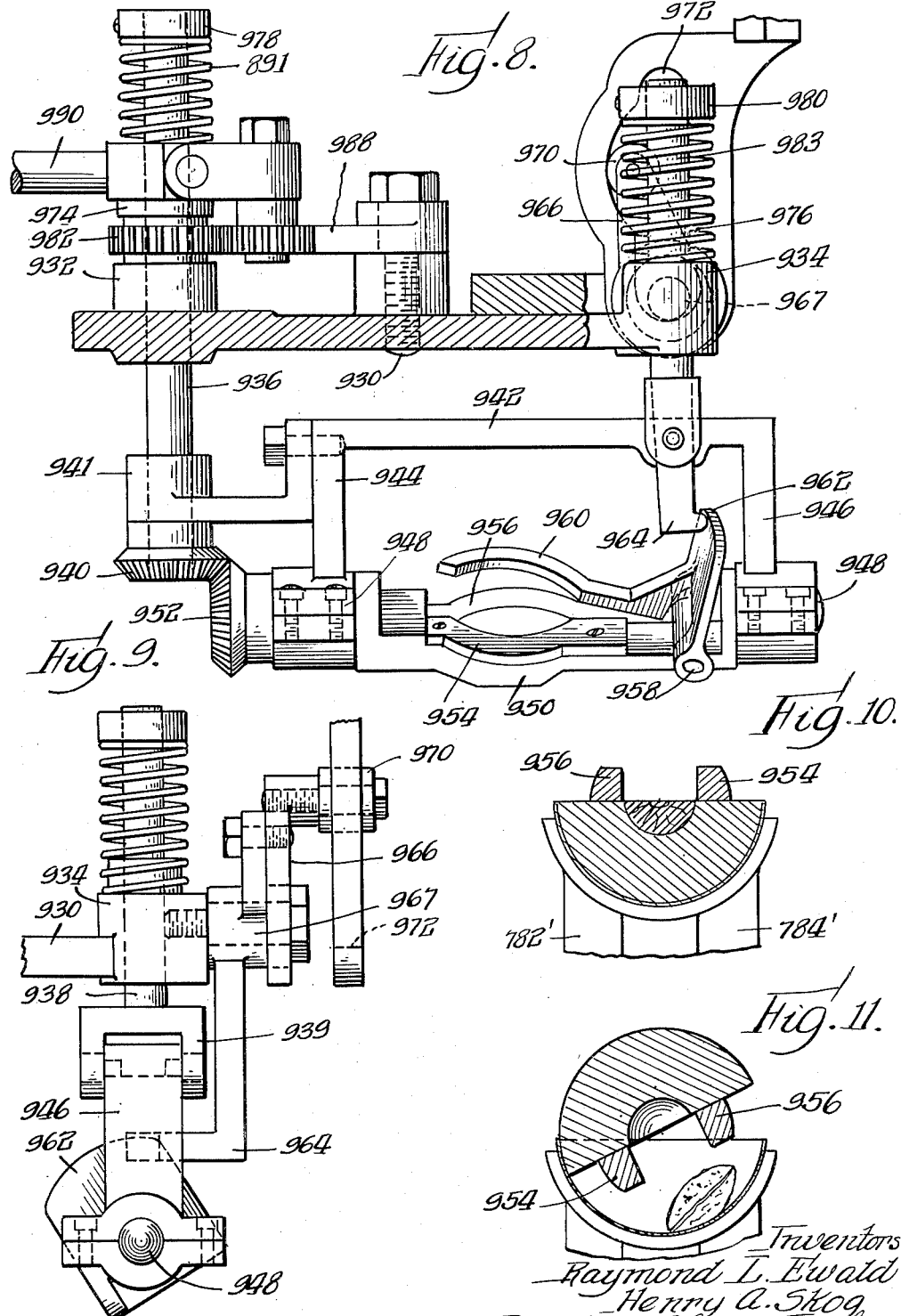

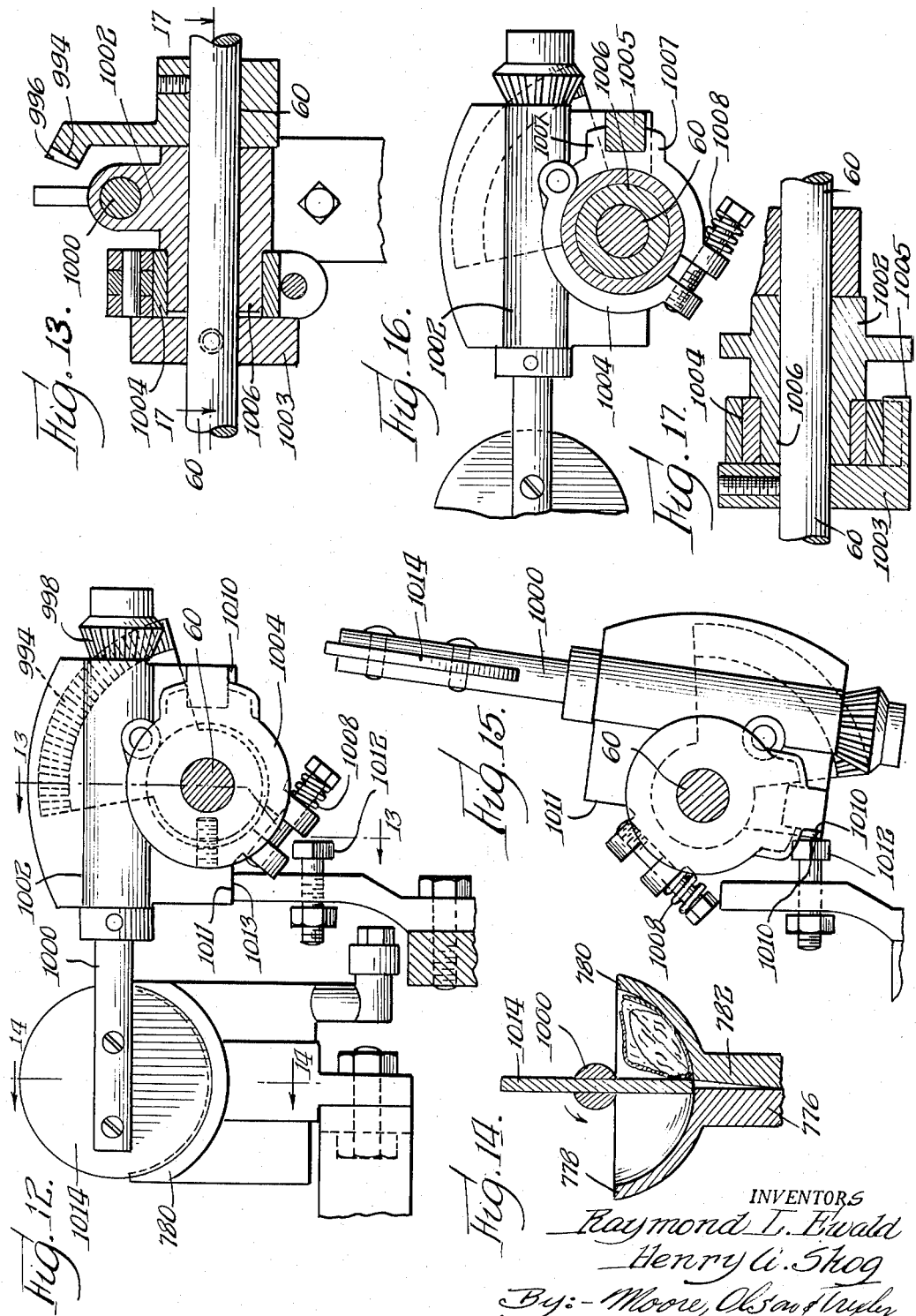

Patented Dec. 30, 1952

2,623,564

UNITED STATES PATENT OFFICE 2,623,564

FRUIT PITTING METHOD AND APPARATUS

Raymond L. Ewald and Henry A. Skog, Olympia, Wash., assignors to Special Equipment Company, Portland, Oreg., a corporation of Oregon Application November 8, 1945, Serial No. 627,399

31 Claims. (Cl. 146—238)

This invention relates to fruit treating apparatus, and more particularly to a machine for pitting half fruit, such as peaches and the like, particularly clingstone peaches.

The present application contains subject matter carved out of our pending application Serial No. 430,840, filed February 14, 1942, issued November 13, 1945 as Patent No. 2,388,682.

In general, we have shown the apparatus herein as being the pitting portion or pitting station of an organized machine for completely processing peaches and the like, and in the present instance the device is illustrated in connection with an organized machine including an intermittently operable turret carrying a series of spaced fruit cups, each adapted to hold a half peach. The pitting mechanism is preferably mounted above the path of movement of the fruit cups and means is provided for providing a relative shifting movement between the fruit cups and the pitting mechanism to bring them into adjacency for the pitting operation and then to move them relatively to permit another cup mechanism to be brought into pitting position.

While the present invention is illustrated in connection with the instrumentalities disclosed in our prior Patent No. 2,388,682, such illustration is merely for purposes of exemplification and not by way of limitation, since the invention has broader adaptations.

The main object of the present invention is to provide a pitting device for pitting peaches and the like, and particularly clingstone peaches, wherein instrumentalities are provided for causing the pit to be severed from the peach and to be maintained in the pit cavity after severance, so that when the half pit is subsequently discharged from the peach holding mechanism, such as the pit cup, the pitted half peach may be discharged from the peach holder separately from the pit, the pit being discharged into the cup or peach holder and then subsequently scavenged from the peach holder by subsequently acting means.

Another object of the invention resides in providing in a peach pitting apparatus for clingstone peaches and the like, in association with the pitting means, additional means for contacting the cut face of the half peach while held in the peach holder for holding the severed pit in the pit cavity after the pitting operation has been completed.

Yet another object of the invention resides in providing a pitting apparatus for pitting clingstone peaches and the like which includes in addition to the means for holding the peach during the pitting operation and for providing means adapted to press upon the cut face of the half peach to hold it in the peach holder during the pitting operation, additionally providing means operating in association with the pitting means for contacting the severed face of the half pit for holding it in the pit cavity after the pitting operation.

Another object of the invention resides in providing in a pitting mechanism for pitting clingstone peaches, in association with the holder for holding the half peach to be pitted, an apertured plate adapted to contact the flesh of the cut face of the half fruit to hold it in the peach holder during the pitting operation and likewise to provide apertured pitting mechanism to sever the pit through the aperture in the plate and also to provide a pitting mechanism operable through the apertured plate to contact the half pit to hold it in the pit cavity during and after the pit severing operation.

Another object of the invention is to provide an organized machine which includes a plurality of spaced half fruit holders for holding half peaches and associated pitting mechanism and separate mechanism for discharging the pitted half fruit from the fruit holder and for discharging the severed half pit or pit section into the fruit holder, in combination with pitting mechanism and additional means operable therewith for holding the half pit in the pit cavity after the pitting operation, so that when the fruit discharge mechanism operates to discharge the pitted half fruit from the fruit cup it will discharge the severed pit section from the fruit cavity into the fruit holder where the pit may thereafter be scavenged from the fruit holder.

Yet another object of the invention is to provide an improved method of pitting clingstone peaches.

These and other objects of the invention will be apparent from a perusal of the following specification, when taken in connection with the accompanying drawings, wherein:

Figures 5, 6 and 7 are successive views of the mechanism for holding the severed pit in the pit cavity during and after the pitting operation;

Figure 8 is a side view of the processed fruit discharge;

Figure 9 is an end view thereof;

Figures 10 and 11 are successive views of the manner in which the fruit is discharged from the fruit cup; and Figures 12, 13, 14, 15, 16 and 17 are views of the pit scavenging mechanism and correspond to Figures 61 to 66 inclusive of our prior Patent No. 2,280,813.

Inasmuch as the details of construction of the main parts of the organized machine are disclosed in the patent to Ewald et al. No. 2,280,813, issued April 28, 1942, and Patent No. 2,388,682, considerable advantage has been taken of the description and the drawings of said Patent 2,280,813, reference to which is made as being a part hereof for those elements of the machine which are not specifically illustrated herein. However, inasmuch as the main features and objects of invention of the present invention are concerned with the pitting station and also with the pitting station in combination with the subsequent discharge of the pitted half fruit from the fruit cup or fruit holder, plus the utilization of a processed half fruit discharge and a subsequent pit scavenging mechanism, we shall refer to the details of the pitted half fruit discharge mechanism shown on sheet 22 of Patent 2,280,813 and the scavenging mechanism shown on sheet 23 of said patent, as being part of the present disclosure as showing the mechanism for discharging the pit section held in the pit cavity into the fruit cup while and as the pitted half fruit is discharged outside of the fruit cup, and then subsequently referring to the scavenging mechanism for scavenging the pit from the fruit cup.

The present invention is best exemplified by reference to an organized automatic machine adapted to receive a succession of half peaches, preferably clingstone peaches, each received in a half cup, or other peach holder, for continuously passing each of the succession of half fruits through the machine and for pitting each half fruit while so held and holding the severed pit in the pit cavity, and thereafter inverting the pitted half fruit to discharge it from the pit cup and simultaneously to discharge the held severed pit into the fruit cup, and thereafter for scavenging the severed pit from the fruit cup, the processed pitted half fruit being discharged out of the machine to a separate and remote point.

Figure 1:
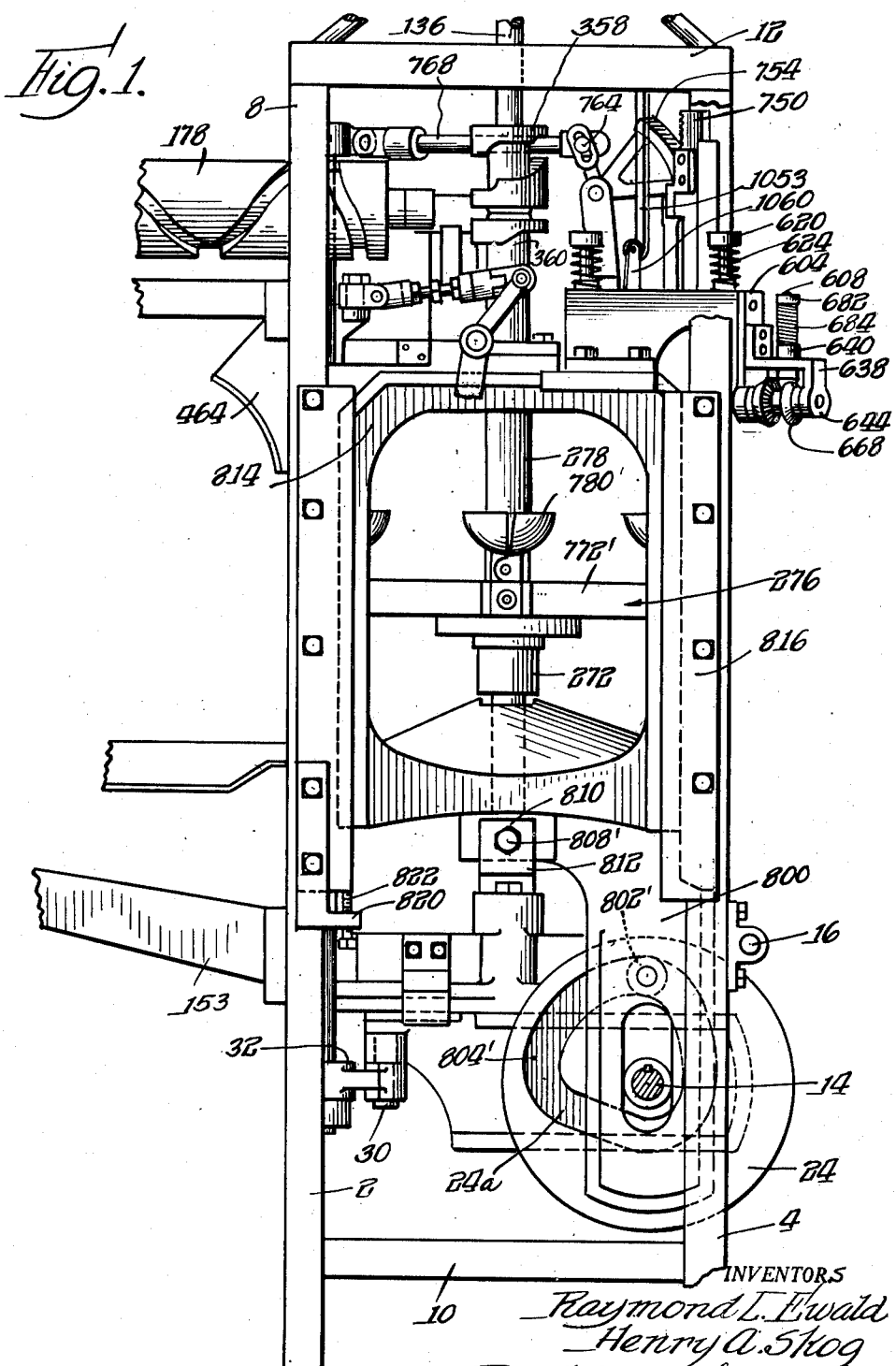
Figure 1 is a side elevation of an organized machine for pitting peaches.
Figure 2:
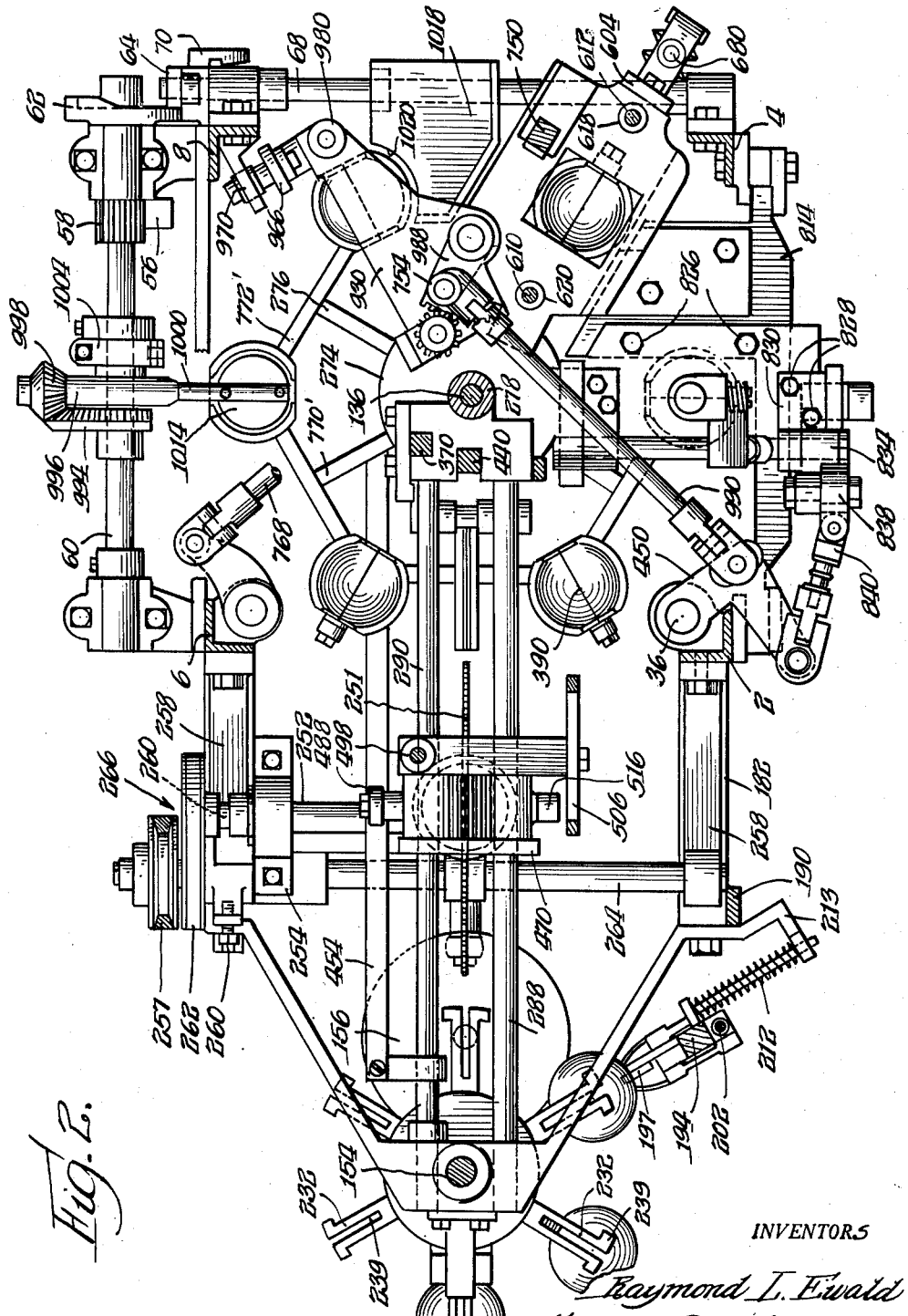
Figure 2 is a plan view of the same, showing the pitting station and the fruit discharge station and the scavenging station.

Figure 1 of the drawings corresponds to the right hand side of Figure 1 of Patent 2,280,813, and Figure 2 of the drawings corresponds to Figure 2 of said patent, the figures including the additional features of the present invention which distinguish from the structure of the prior machine.

Description of machine

In order to exemplify various features of not only the broad but more specific aspects of the present invention, the same is described as applied to a type of machine disclosed in the drawings. It is, however, understood that such machine is but one form of the many different embodiments the invention is capable of taking, and that such illustration and disclosure is purely by way of illustration and not by way of limitation.

The machine of the present construction preferably takes the form of an upright, substantially square frame comprising four corner posts or angle irons 2, 4, 6 and 8, suitably braced at top and bottom by cross braces 10 and 12. In addition, other hereinafter described cross bars serve as rigid bracing for these upright members. In a general way, extending laterally from this rectangular frame, projects a supplementary frame adapted to be bolted or otherwise attached thereto, as clearly shown in Figures 1, 4 and 6. This supplementary frame is utilized to support the mechanism which initially receives the fruit, the mechanism which cuts the fruit in halves and transports it to the peeling, pitting, fruit discharging and peel and pit scavenging mechanism, the latter mechanism being supported on the rectangular frame. A fuller description of this arrangement will be given subsequently.

The upright frame hereinafter described is provided on a relatively low level thereof with horizontally disposed shafts 14 and 16. Shaft 16 is power driven through clutch mechanism 17, which includes a drive pulley 18 adapted to be driven from any suitable motor 21 carried on a bracket mounted on the frame of the machine, all as shown in Figure 1 of Patent 2,280,813. The clutch mechanism 17 on the power drive is similar to that described in the pending applications of Mark Ewald and particularly Patent 2,388,682 of November 13, 1945 and Patent 2,280,813 of April 28, 1942 and comprises purely a clutch for connecting and disconnecting the electric power source to the main operating shaft of the machine, and no portion of the present invention is concerned with the details of the clutch mechanism.

Shaft 16 carries a gear driving another gear 22 on the horizontal shaft 14. As shown in Figures 26 and 27 of Patent 2,280,813 this shaft 14 carries two main cams 24 and 26 fixed on opposite ends thereof. Each of these cams is double faced so as to provide cam operating means on the two opposed faces of each cam. One of these opposed cam faces such as 24a comprises a cam track in which operates a roller, hereinafter described, of a vertically reciprocable slide 814 for raising and lowering the main tool carrying slide, hereinafter described. The opposite cam face forms a roller race in which a roller on a horizontally reciprocable slide 28 shifts in a horizontal motion transversely of shaft 14, and carries on its outer end a bearing pivot 30 linked to a bearing pivot 32 on an arm 34 fixed on a vertical shaft 36 having fixed bearings in the corner frame 2 of the main upright frame of the machine see Figure 26 of Patent 2,280,813. This vertical shaft 36 is oscillated by the slide 28 for operating the peeling mechanism hereinafter described and also for operating the fruit discharging mechanism hereinafter described by means of cranks fixed to the upper end of this vertical oscillatable shaft 36.

Figure 4:
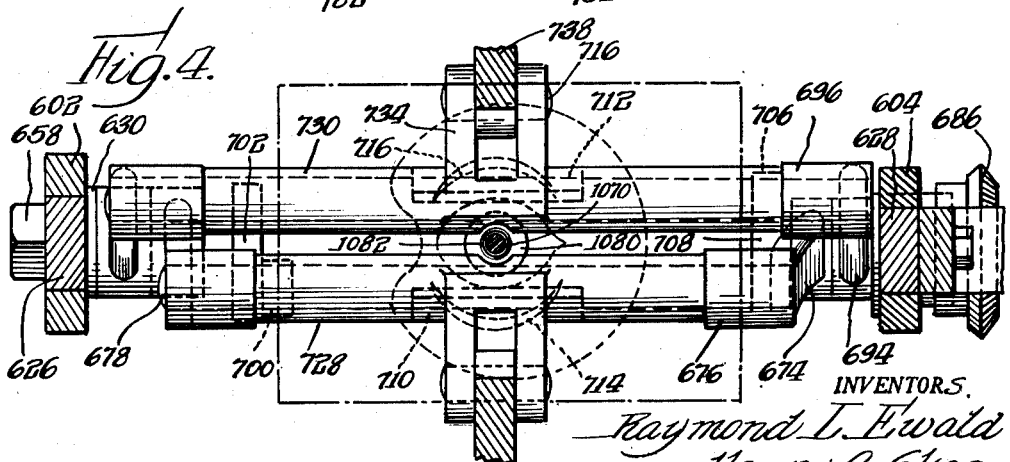
Figure 4 is a sectional view taken on the line 4—4 of Figure 3.

The cam 26 on shaft 14 see Figures 4 and 27 of Patent 2,280,813 has a cam face 26a formed as a cam race in which operates a roller on a somewhat similar horizontal reciprocable slide 38 and corresponding to slide 28, which slide 38 is also provided on its outer end with a bearing 40 for a vertical pin 42, to the lower end of which is pivoted a link 44. This link 44 carries at its outer end a link 46, the outer bearing 48 of which is pinned to a vertically oscillatable shaft 50 which is mounted in the corner post 8 of the frame and in an opposite manner to the vertical shaft 36. This shaft 50 carries on its upper end a fixed arm hereinafter referred to, which in turn pivotally connects at its outer end to a relatively long rod running diagonally across to a universal connection in turn connected to mechanism which operates a gear sector reciprocable on a horizontal axis for operating the mechanism which actuates the pitting knives, all as will be hereinafter set forth.

Cam race 26b operates a vertically reciprocable slide 52, see Figure 27 of Patent 2,280,813, the upper end of which is provided with a rod 54 having a rack tooth portion 56 operating a pinion 58 on a horizontal shaft 60 see Figure 2 of the present application. This shaft 60 is oscillated by the rack and pinion to operate a cam 62 on the outer end of this shaft, which in turn is adapted through the instrumentality of a roller 64, mounted on a pivoted arm 66, see Figure 28 of Patent 2,280,813, to operate a horizontal shaft 68 having bearings on the outside of the vertical frame member and on a level of the main fruit cup turret, hereinafter described and above the lower levels of the machine that carry the shafts 14 and 16.

As shown in Figure 7 of Patent 2,280,813 the arm 66 which is carried by the shaft 68 has an extending portion 70 which engages a spring 72 mounted between it and the corner post of the main frame for normally pressing the roller 64 toward the cam 62. The shaft 68 operates the mechanism for (a) positioning the rubber pad over the fruit cup for vertically holding the peel therein, and for (b) oscillating the fruit discharge trough, preferably carrying this rubber pad. These mechanisms (a) and (b) will hereinafter be more fully set forth.

As clearly shown in Figure 2, the present machine provides a greater number of stations and operation than prior types of machines disclosed in the patents of Mark Ewald. While the present invention is not limited to a machine having the exact sequence of apparatus for performing the different operations upon the fruit passing through the machine, the present disclosed arrangement is particularly desirable for the automatic treatment and processing of peaches and in the disclosed sequence of operations. In the present instance these stations and operations include:

1. A whole fruit feed station.
2. A peach stem cavity cutter and peeler.
3. A whole peach dividing and transfer station.
4. A spreader station where the cut halves are deposited in the half fruit receptacles on the main intermittently rotating turret mechanism.
5. A peeling station for peeling a single half peach or other half fruit.
6. A pitting station for pitting a single half peach or other half fruit.
7. A discharge station for discharging a single peeled and pitted half fruit.
8. A peel scavenging station.

In the present organized machine, particularly as distinguished from the prior Ewald type of machine, it is not practicable to discharge the half fruit from the machine at the same station at which the seed-containing section is severed. So also it was not practicable to pit and/or peel two halves simultaneously. This present machine is arranged simultaneously to pit a single half peach or other half fruit at one station while also peeling a single half peach or other half fruit at another station. This, therefore, results in the provision of a separate station for effecting this half fruit discharge. This in turn has made desirable a six half-fruit-holder turret instead of a four as heretofore provided. This six holder arrangement for the half fruit in turn makes desirable the disposition of single half fruit holders radially of the turret instead of in parallel pairs as heretofore; and this in turn, in conjunction with the six fruit holder feed-in turret for the whole fruit, requires means for spreading the fruit halves from a parallel position of the suture axes of the severed halves of a fruit to a position where such suture axes converge and lie radially of the axis of the second turret. This in turn has demanded a different motion of the half fruit spreaders as distinct from the single arcuate swing in the prior Ewald devices plus provision of means for driving the half fruit turret at twice the speed of the whole fruit turret whereby each half fruit holder of the latter turret is shifted say one hundred twenty degrees intermittently as the corresponding whole fruit holder is shifted sixty degrees to provide two spaced adjacent empty holders to receive the split halves of a whole fruit from each of the single holders of the whole fruit turret.

A second level of the main rectangular frame of the machine, bounded by the uprights 2, 4, 6 and 8, provides a location for the Geneva gears for driving the main half fruit holding turret and also the whole fruit feed turret, including the driving means therebetween, whereby the main half fruit holder turret is driven twice as fast as the whole fruit feed-in turret. For effecting this function, horizontal shaft 14 carries between its ends a bevel gear 110, see Figure 5 of Patent 2,280,813, meshing with a bevel gear 112 on a vertical shaft 114 mounted in a bearing 116 (Figures 4 and 5 of Patent 2,280,813) carried by a cross frame 118. This cross frame is supported at one end by suitable vertical bracing connected to a cross bar 120 (Figure 5 of said Patent 2,280,813) carried by the vertical upright frame members 4 and 8. The opposite end 122 of cross frame 118 is bolted to an end support by a projection 124 from a horizontal cross bar 126 carried by the opposite vertical uprights 2 and 6 of the main frame at about the level of the cross frame 118. This cross bar 126 is preferably an integral part of the substantially triangular-shaped supplemental frame carrying the whole fruit feed-in turret and the transfer mechanism.

Horizontal shaft 114 carries a bevel gear 112 (Figure 5 of Patent 2,280,813) and also carries above it a gear 128, which latter meshes with a second gear 130 on a bearing 132 on the cross frame 118. Gear 130 meshes with a larger gear 134 horizontally fixed on a vertical turret shaft 136 having a bearing in cross frame 118. Turret shaft 136 is surrounded by a bearing 138, above which is a long sleeve 139 upon which is fixed a Geneva gear 140 having six slots, cooperating with a Geneva member 142 on shaft 114. This latter geneva 142 has the usual circular periphery provided with a roller 144 for cooperation with the six radial slots aforesaid, for rotating the Geneva wheel and sleeve 139 and for holding it stationary between partial turns. The upper end of shaft 114 above the Geneva member carries a sprocket gear 146 (see Figure 6 of Patent 2,280,813) driving a chain 148 running horizontally across the frame of the machine to a larger sprocket 150 fixed to shaft 152. This shaft 152 is mounted on a substantially triangular frame 153 carried by and integral with the cross bar 126. The outer end of frame 153 carries a bearing for the shaft 152 and also has a heavy extension bearing 155 (Figure 3 of Patent 2,280,813) for whole fruit turret shaft 154, see also Figure 2 of the present application. Both of these shafts are vertical and parallel to each other. Shaft 152 (see Figure 1 of Patent 2,280,813) extends upwardly a short distance and is provided on its upper end with a disc-like cam 156 of the tracker type, for operating the saw shifting mechanism. Whole fruit turret shaft 154 extends vertically upwardly toward the top of the frame and carries the whole fruit feed turret sleeve 161 rotatably mounted thereon, Figure 3.

Shaft 152 at its lower end has a roller element 158 of a Geneva movement fixed to it, and sleeve 161 has a slotted element 160 of the cooperating Geneva part fixed to it. This slotted geneva fixed to it the sleeve 161, see Figure 1 of Patent 2,280,813, which sleeve in turn carries the feed finger turret 162 provided with six whole fruit feed fingers.

Inasmuch as the present invention is concerned mainly with the pitting station, followed by the fruit discharge station and followed by the scavenging station, no description will be given of the whole fruit feed-in station, the stem cavity cutter or peeler, the whole fruit feed-in turret, the flesh and pit dividing means, or the main fruit holding turret, other than to say that the latter comprises means for holding the divided or half fruit sections in a manner so that such sections may be subjected to one or more treatments; specifically, so that the half peach sections carrying the half pits therein uppermost may be held preferably with the longer axes of the pits substantially coinciding with the radius line of the turret that passes through the fruit holder holding such half fruit, whereby the axis of movement of not only the pitting means but also the peeling means will lie approximately parallel to the longer axis of the pit, and whereby the peeling, pitting and discharging of the half fruit from the holding means is facilitated.

Figure 3:
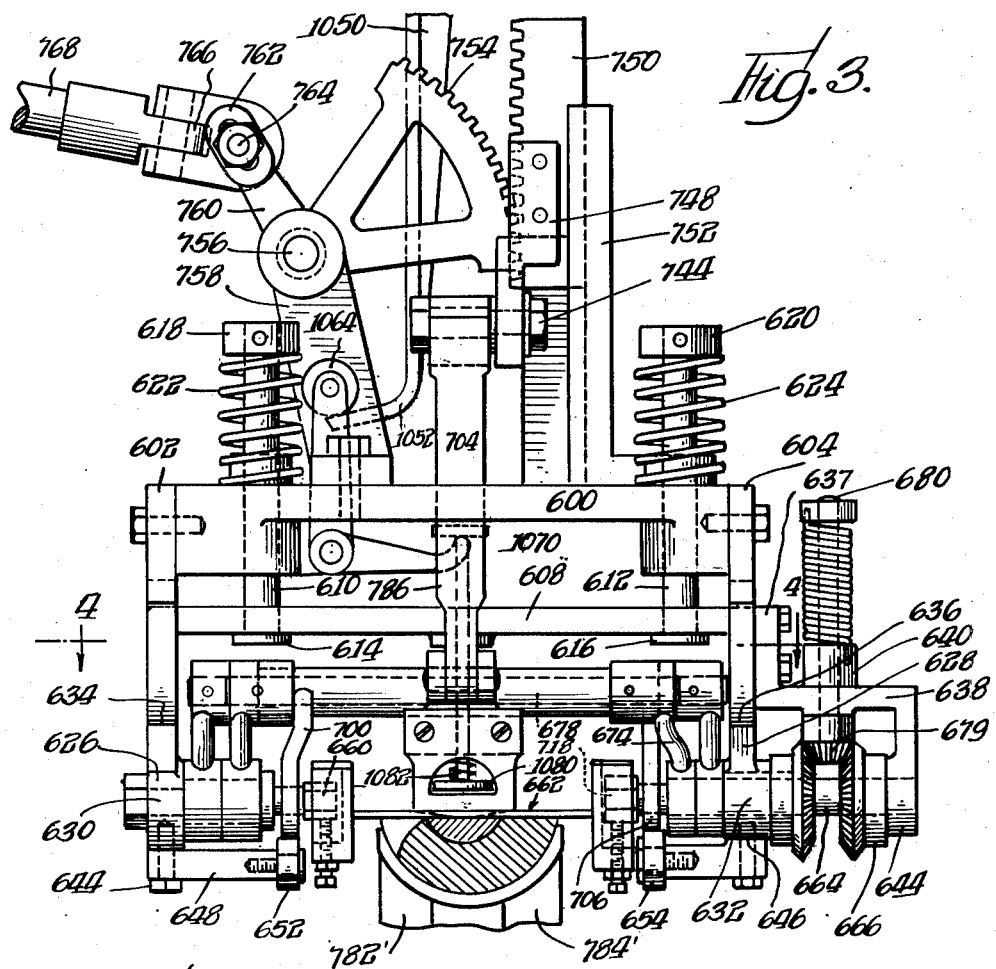
Figure 3 is a side view of the pitting device.

In the present instance and as shown in Figures 3 and 5 of Patent 2,280,813 there is provided a sleeve 139 which turns loosely on the main vertical shaft 136 and extends upwardly above the Geneva disc 140. This disc is fixed to the lower end of sleeve 139. The upper end of sleeve 139 carries a boss 272, see Fig. 3 of Patent 2,280,813 and Figure 1 of the instant application, having an upper disc 274 to which the bottommost spider of the fruit holding turret 276 is adjustably bolted, the adjustment serving to provide angular adjustment of the fruit holding turret relative to its turning sleeve, whereby to provide an adjustment for insuring that the half fruit receiving and spreading transfer wings or members, hereinafter described, are at the proper closed together position at the time the fruit halves come onto them.

As clearly shown in Fig. 2, the turret disc is provided with a spider providing a mounting for the half fruit receiving means, herein specifically shown as cups. There are six of these cups, each disposed with its center located radially of the shaft 136.

Directly surrounding shaft 136 above turret 276, is located a long sleeve 278, see Figs. 1 and 2 of Patent 2,280,813. This sleeve forms a mounting for a plurality of devices. It is formed at its upper portion with a preferably integral outstanding projection 280 which faces toward the transfer jaws. As shown clearly in these figures, and particularly Figure 17 of this patent, this projection 280 is formed somewhat generally rectangular. In the side facing the feed-in station it is formed with a substantially central vertical guideway 282 of rectangular cross section. On either side there are provided horizontal bores 284 and 286. Bore 284 receives stationarily one of the rails 288 (Fig. 15 of Patent 2,280,813) for the slidable carriage of the transfer jaws. The rail is held fixed therein by means of a set screw. The other bore, 286, receives a bushing 289 (Fig. 25 of Patent 2,280,813) into which is turnably mounted the other round rail 290 (Fig. 15 of Patent 2,280,813) forming the carriage slide. Lateral face 292 of the projection 280 is formed with a vertical guideway 294 of rectangular cross section. In addition, the walls of this lateral face 292 are provided with bolt holes to receive bolts 296 for attaching to this face and closing the face of the guideway 294 a vertically extending bracket 298, the top of which overhangs the projection 280 and is formed with a laterally extending arm terminating in a bearing sleeve 300 in which is loosely mounted shaft 174, see Fig. 3 of Patent 2,280,813. Shaft 174 is driven by shaft 154 of the feed-in turret and has a circular collar 302 pinned thereto, as at 304, which circular collar supports fixedly thereto by means of the same pin 304 the cylinder 178, upon the outer wall of which an endless screw 308 is formed.

The lower portion of long, vertical sleeve 278 is formed with a preferably integral, substantially rectangular, flat portion 310 which extends laterally of the sleeve. This plate is likewise provided with a rectangular raised boss 312 which terminates on each side short of the vertical sides of the flat portion 310 to provide two spaced guides 314 and 316. The front face of the raised boss 312 is formed with a threaded bore 318 into which passes a bolt 320 (Fig. 17 of Patent 2,280,813) for firmly fixing to the raised boss a bearing block 322, having on its top spaced half bearings 324 and 326 so that the upper inner faces of the half bearings 324 and 326 are spaced from the front face of the flat portion 310 to provide room for intermeshing sectors 328 and 330 fixed on the inner ends of short shafts 332 and 334. These shafts oscillate in the bearings 324 and 326, and their outer ends have fixed thereto short levers 336 and 338, which each have at their upper ends outwardly and oppositely facing bushing sleeves 340 and 342. Bearings 324 and 326 are closed by upper half bearings 344 and 346 formed in a cap 348 fastened to the block 322. This bearing block 322 is formed at its bottom with opposed extensions 350 and 352 having threaded bolt holes. To each extension is bolted a vertically extending cam 354 and 356.

Means is provided for operating the half fruit spreaders from the central rotatable vertical fruit turret shaft 136 and for likewise operating therefrom the fruit transfer jaw mechanism. Above the upper end of the long, vertical sleeve 278 and adjacent the overhanging bracket 300 are positioned two cams 358 and 360 (Fig. 17 of Patent 2,280,813). These cams directly surround shaft 136 and are pinned thereto for rotation with shaft 136. Each of these cams is formed with an endless cam race of desired shape, in each of which operates a roller 366 and 368. Roller 366 is mounted upon the upper end of a vertically reciprocable rack rod 370 which slides in guideway 294 of the upper bearing 289 on sleeve 278. This rack rod has fixed to its lower end a rack 372, the teeth of which, as shown in Figs. 17 and 25 of Patent 2,280,813, mesh with the teeth of the sector 328.

No description will be given of the half fruit spreaders for distributing a half peach section into each of the fruit cups, nor will any description be given of the fruit transfer mechanism.

The pitting mechanism

The pitting mechanism includes a preferably vertically reciprocating carriage 600 (see Figure 32 of Patent 2,280,813 and Figure 3 of the present application) which is preferably horizontally disposed. This carriage plate 600 has its opposite ends provided with depending furcations 602 and 604 suitably bolted thereto, as shown in said Fig. 3. These furcations provide vertical guideways 606 (see Figures 34 and 35 of Patent 2,280,813) for slidably receiving a vertically, resiliently adjustable pitting frame 608. This frame 608, as shown in Figure 3 of the present application, has spaced portions receiving pins 610, 612, which pins have heads 614, 616 on their bottoms below the frame. The upper portions of these pins pass through the bores of the carriage 600 and are provided thereabove with adjustable stop collars 618 and 620 which determine the lowermost positions of this pitter frame 608 with respect to the carriage 600. The upper ends of these pins 610 and 612 are provided with coiled springs 622 and 624 spaced between the collars 618, 620 and the top of the carriage 600. These springs resiliently support and balance the frame 608 on the carriage. One end of the pitting frame 608 is heavier than the other because of the gearing thereat. These two adjustable springs 622 and 624, when adjusted, serve to balance the weight of the main pitter frame 608 with respect to the carriage 600, and also reduce to a minimum the pressure exerted on the tender face of the half peach. This pitter frame 608 is preferably formed like an inverted yoke and comprises a horizontal cross portion and two legs 626, 628. Each of these legs is a straight, vertical leg and is provided with a bearing. Leg 626 is provided with a bearing 630 and opposite leg 628 is provided with a bearing 632. The bottoms of the vertical guideways 602 and 604 of the main carriage 600 terminate at 634 and 636 respectively. Vertical leg 628 had bolted to it an extension leg 637 formed with a lateral horizontal extension 638, provided in turn with an upstanding boss 640. The boss and the lateral extension are bored to receive a vertical shaft, later to be described. Extension 638 is formed with a vertical leg 642 having a bearing 644 which is bored and is in registration with the bore in the bearing 632 of the adjacent leg 628. Thus the vertical legs 626, 628 and 642 slide vertically in the vertical guideways of the carriage 600. The two bearings 630, 632 each have bolted to the under side thereof, as at 644 and 646, a short bar-like support 648, 650, which supports extend inwardly and each has a roller 652, 654 rotatably supported thereon. These rollers form supports for mechanism hereinafter described.

Bearing 630 clampingly supports a fixed shaft 656 (see Figure 3 of the instant application) by means of a nut 658, which shaft has on its opposite innermost end a boss 660 which is flattened on its opposite vertical sides to form a guide for slidingly supporting and guiding the apertured presser plate 662. A second short shaft 664 is loosely disposed on bearing or gauge 644 and 632. This shaft 664 has pinned thereto, as at 666, a bevel gear 668, and also has pinned thereto, at 670 (see Figure 33 of Patent 2,280,813 and Figure 3 of the instant application), in spaced relation therefrom, a collar 672 carrying a lever 674 which at its upper end is formed as a bored collar 676, to which is pinned a cross shaft 678. Bevel gear 668 meshes with a bevel pinion 679 fixed to shaft 680 which passes through the boss 640 on the extension arm 638. The upper end of this shaft is formed with an adjusting collar 682 and a coiled spring 684 is fixed to the collar and to the extension. A second bevel gear 686 meshes with pinion 679. This bevel gear 686 is pinned at 688, see Figure 33 of Patent 2,280,813, to a sleeve 690, through which the shaft 664 passes. This sleeve 690 oscillates in bearing 632 and extends inwardly to a collar 692 which is integral therewith. This collar 692 has an integral lever 694 which has on its upper end another collar 696 pinned as at 697 to a second cross shaft 698 running parallel to the first shaft 678. Each of these shafts 678 and 698 has a long sleeve 728 and 730 loosely surrounding it, see Figure 39 of Patent 2,280,813 and Figure 4 of the instant application. Each of these sleeves has intermediate its length a lug or arm 710, 712, to which are detachably fastened the pitter blades 714 and 716. Sleeve 728 has in addition an integral arm 700 having on its bottom an enlargement 702 formed with an elongated slot 704 through which passes the fixed extension shaft 656 carried by the bearing 630, see Figures 52 to 56 of Patent 2,280,813. This slotted enlargement cooperates with rollers 652 so that such roller in certain positions of the enlargement will limit its downward movement.

The other elongated sleeve 730 likewise has integrally depending therefrom an arm 706, the bottom part of which forms an enlargement 708, likewise provided with an elongated slot 709. This enlargement 708 in turn cooperates with roller 654 so that the latter in certain positions of the enlargement will limit the downward movement of the enlargement 708.

The extreme inner end of shaft 664 is of reduced diameter, as shown at 718, see Figure 3 of the instant application and also Figures 40 to 42 of Patent 2,280,813, and is provided with a bushing 720 which is flattened on its two opposite vertical sides 722, 724 slidingly to support and guide the opposite upstanding block 732 on the apertured presser plate 662.

The slots 704 and 709 (Figures 47 to 51 of Patent 2,280,813) in the enlargements of arms 700 and 706 are on an arc that corresponds to the distance between the center of rotation of the sleeves and the center of rotation of the shafts on which they are pivotally supported for oscillation.

The rollers 652 and 654 comprise means for preventing these slotted enlargements from dropping down when the arms 700 and 706 are swung to substantially a horizontal or diagonal position with respect to the presser plate 662. If these arms 700 and 706 were to drop downwardly at this time it would permit the pitter blades carried by the sleeves 728 and 730 to open and to swing downwardly into the body of the peach during the pitting operation, whereas it is necessary to cause the pitter blades to move in a truly circular arc and to keep them together to complete the severance of the under side of the half fruit. To this end the bottoms of the main pitter frame 608 are provided with these rollers 652 and 654 (see Figure 3 of this instant application) which are thus positioned immediately under the path of oscillation of each of these slotted arms 700 and 706 to permit free, unsupported swinging movement of each of said slotted arms 700 and 706 for about a distance equivalent to less than one-third of the way around the under side of the pit, at which time the under surfaces of these slotted enlargements come in contact with the rollers 652 and 654, thereby preventing each arm from dropping down and compelling each arm and hence each pitting blade to swing in a truly circular path and hence follow closely the contour of the under side of the pit. The ends of the slots 704 and 709 cooperating with the shaft 656 and 664 give control of the cutting edges so that they will meet properly at the finish of the cutting.

The function of the bevel gearing 668, 679 and 686 (see Figure 3 of the present application) and the spring 684 is to provide tension between the pitter sleeve arms 700 and 706 through the bevel gears whereby to keep these arms together in their uppermost positions, and to provide sufficient spring resistance to be greater than the resistance offered by the drag of the pitter blades across the face of the flesh of the half fruit into contact with the marginal walls of the pit. At this time the pit offering greater resistance to the further dragging movement of these pitter blades, the spring resistance of the spring 684 is now overcome and the pit stopping this dragging movement of the blades in their inward pit-locating movement, the blades then start to swing down through the flesh under the pit, around a common fulcrum or pivot point. The central axis about which these arms 700 and 706 now swing is the axis of the stationary shaft 656 and the axis of the coaxial oppositely disposed movable shaft 664. During the locating movement of the pitter blades, the axis about which each of the pitter blades swings is the axis of the elongated sleeve that carries such particular pitter blade. As shown in Figures 47 to 51 of Patent 2,280,813, during the pit finding or locating movement of the pitter blades, blade 714 will first swing about the axis of the shaft 678 carrying the sleeve 728, and blade 716 will first swing about the axis of the shaft 698 carrying sleeve 730. However, as soon as the pitter blade contacts the side walls of the pit, the pit will then form a fulcrum preventing further independent swinging of the arms 700 and 706 about their respective axes 678 and 698 and thereafter the said arms will swing about the common axis 656, which is the central axis of the coaxial shafts 656 and 664. By this means the pitter blades which swing with these arms will then follow closely, in a truly circular pathway, the marginal outlines of the pit, thus reducing to a minimum the amount of flesh cut from the fruit during the pitting operation. In short, the pitter blades will shift across the cut face of the half fruit, swinging on their respective axes 678 and 698, until each blade locates its respective edge of the pit, and thereafter each blade will then swing about the common axis 656 which is located very close to the cut face of the half fruit. The location of this shaft 656 is adjustably predetermined so that the arcuate swing of the pitter blades will be of just sufficient depth to cut cleanly around the under side of the pit without digging any extra amount of flesh of the peach.

The bevel gears of the gearing 668, 679 and 686 equalize and cause the pitter blades to move uniformly through their cutting strokes, i. e., they tend to prevent one blade running ahead of the other.

Each sleeve 728 and 730 is provided intermediate its length with an outstanding short furcation 732 and 734, see Figure 39 of Patent 2,280,813 and Figure 4 of the present invention, to which is pivoted the bottom of an arm 736 or 738 curved outwardly at its bottom and extending upwardly, see Figure 7 of the present application and also Figures 43 to 46 of Patent 2,280,813. Means is provided to compensate for varying thicknesses of the half fruit to be pitted or cored. To this end the top of each arm 736 and 738 is slotted as at 740, 742, see Figure 7 of the present application, slidingly to engage a pin 744, 746 adjustably carried by a block 748 fastened to a vertical rack 750 supported by a guide 752 on the carriage 600. This rack 750 is reciprocated by a sector 754 pivoted at 756 on a mounting 758 on the carriage 600 see Figure 3 of the present application. This sector in turn is oscillated by an arm 760 having a slotted hole 762 engaging a pin 764 on a universal 766 on the end of an adjustable rod 768 operated by the vertically disposed oscillatable shaft 50 (Fig. 2) of the present application, hereinbefore described.

Figure 7 of the present application shows the drive studs 744, 746 in the upper end of the slot, thereby holding the pitting blades in an open position as the assembly lowers down onto a half peach. Figure 7 shows the gauge plates 662 in contact with the fruit, and an example is depicted wherein the fruit is thick enough to raise the assembly to a point where the drive studs 744, 746 are in the center of the slots. If these slots were not provided, a thin piece of fruit would not get proper contact and a thick piece would be smashed, due to the fact that studs 744, 746 were rigidly placed at this time.

At the initiation of the pitting operation, in view of the fact that the successive half pits may be located either centrally of or to either side of the center of the half peach to be pitted, we have provided means for causing the pitting mechanism to travel laterally across the cut face of the half fruit and to contact the peripheral edge of the severed half pit before digging into the flesh of the fruit at the cut face thereof. In order to accomplish this action, the pitting means is provided with one or more, preferably one, relatively sharp points centrally located, which is the only part of the pitting means which actually penetrates the flesh of the fruit at the cut face thereof prior to the actual pitting operation. During this operation the cutting edges of the pitting means actually cut into the body or flesh of the half fruit, starting at the cut face of the half fruit at the peripheral or marginal edges of the severed half pit and following along the under surface in a true circular path and substantially exactly cutting the flesh of the peach cleanly at the juncture of the pit curved surface and the flesh.

To carry this out, at the initiation of the pitting operation it is desirable to project the point or points of the cutting edge of each pitting blade a predetermined short distance slightly into the flesh of the fruit at the cut face of the half fruit and on each side of the severed half pit. This projection of each point on the pitter blade is relatively slight but is sufficient so that during the lateral shift of each blade across the cut face of the half fruit these relatively small points on each pitter blade cut through a slight superficial layer of the cut face of the half fruit, the cut being practically of a line width and being imperceptible, due to the stickiness and moist nature of the cut face of the half fruit, after it has been pitted and processed. This projection of each point on the pitter blade is sufficient, however, so that during the lateral shift these relatively small points on each pitter blade cut through the superficial layer of the cut face of the half fruit until they come into contact with the outer opposed edges of the half pit at the margins of the cut face, and since these points project slightly into the cut face this insures that the points of the pitter blades will contact the pit half slightly beneath the cut surface of the pit at its margin, whereby to insure that the pitter blades will thereafter be directed downwardly around the under surface of the half pit in their cutting movement, so that they will swing around, under or beneath the pit.

Thus means is provided adjustably for insuring and also for determining this initial projection of the points of the pitter blades a desired relatively small depth into the cut face of the half fruit on opposite sides of the half pit. In the present embodiment of the invention there is provided means for contacting the cut face of the half fruit on opposite sides of the central seed containing section, to wit, in the case of a peach or apricot, the half pit, and thereafter utilizing this contacting means adjustably to determine the depth of projection of the pitter blades into the cut face of the half fruit as before described. In the specific construction utilized, the presser plate 662 is preferably formed of two flat, shallow plates 770 and 772 see Figure 40 of Patent 2,280,813. The central edges of these plates are cut out, as at 774 and 776 and these cut-outs are in registration to provide an opening or aperture considerably larger than the greatest diameter of the half pit in order to accommodate variations in eccentric location of the various pits in successive half fruits. By spacing the plates apart as at 778, a sufficient aperture is provided. At opposite ends of these plates, blocks 780 and 782 are provided, which in general shape are similar except for a vertical guideway. Each block is formed with a pair of oppositely projecting arms 784 and 786 to which an end of the presser plate is secured.

In addition, each block is formed centrally with an upstanding portion generally rectangular and provided with a vertically extending rectangular cut-out 790, 792, forming guideways to receive the bushing 720 at one end and the flattened portion 660 of shaft 656 at the other. This is for the reason that shaft 656 does not rotate and therefore the flattened portion 660 holds the presser plate in horizontal alignment and still permits vertical movement. Since shaft 664 rotates, a bushing is provided principally to take up undue wear in operation, otherwise the reduced shaft 718 could slide and rotate in a groove 792 made to fit its own diameter.

The top of each cut-out 790, 792 is closed by a plate 793 secured by a screw 796 see Figures 41 and 42 of Patent 2,280,813. The cut-out guideway 790 of block 780 is narrower than the cut-out guideway 792 of block 784. Cut-out 792 receives the bushing 720 on the inner end of oscillating shaft 664. The vertical sides of this bushing and of the cut-out are parallel and vertical, whereby to permit the presser plate and bushing to have relative vertical movement while the plate is prevented from rotating. Similarly, the somewhat smaller cut-out 790 of block 780 has parallel vertical walls slidingly to receive the flat, parallel, vertical walls 660 of an otherwise round sleeve 656 held securely against rotation in the bearing 630 by the nut 658 see Figure 39 of Patent 2,280,813. It will be remembered that shaft 656 is stationary, while coaxial shaft 664 oscillates, being oscillated by arm 674 integral with sleeve 728, in turn oscillated by lever 736 from the sector and rack mechanism. In addition, each block is provided with a centrally depending portion 802, 803, each bored vertically and threaded to receive an adjusting screw 806, 808, the upper ends of which are adapted adjustably to contact, and in one position support, the bottom portion of the bushing 720 in the case of the block 784, and the circular sleeve 660 in the case of the block 780 see Figures 41 and 42 of Patent 2,280,813. The height of each vertical guideway 790, 792 is sufficient to provide a space between the bushing 720 and the sleeve 660 when supported on their respective screws and the top plate 794 of each block. The adjustment of the screws through the blocks in a clockwise direction will raise the pitting blades relative to the presser plate so that they will not project downwardly through the apertures in the presser plate as far as they would project prior to turning the screws. Adjustment of the screws in the opposite direction will serve to lower the pitter blades relative to the presser plate, whereby when the presser plate contacts the cut face of the half peach the bottom edges of the pitting blades will adjustably project more or less into the cut face of the half fruit, which is to say that the pointed central tips 786 will so project.

On lowering movement of the pitter carriage 600, the presser plate or additional fruit holding means is brought to its lowermost position. If no half fruit is in the cup the presser plate 662 will either rest upon the top of the cup, or if no cup is there, the top plates 793 closing the tops of the cut-out guideways 790, 792 will contact the tops of the pin 660 and bushing 720, respectively. This pin and this bushing rest upon the tops of the screws 806 and 808, respectively, when the presser plates rest on the fruit. These screws provide means for regulating the depth of projection of the cutting edges below the under surface of the presser pads or plates 770 and 772. These cutting edges must extend below far enough to assure closing in under the pit. Now, if upon lowering the pitter head a cup is in proper position and the head contacts a half fruit to be pitted, such as a half peach with its half pit unsevered from the half peach, the presser plate 662 will first contact the upper cut face of the half fruit and there will be relative vertical movement between the blocks 780 and 784 fixed to the now stationary presser plate and the still lowering pin and bushing 660 and 720 until said pin and bushing contact the tops of the adjusting screws 806 and 808. Thus when the presser plate contacts the cut face of the fruit and can move no lower, and when the presser plate screws 806, 808 have been adjusted to the correct setting, the points of the pitter blades will project through the opening in the presser plate the desired amount and the points 786 on the pitting blades will be projected the desired distance into the cut face of the half fruit on opposite sides and spaced from the half pit.

If too much of the half fruit should project above the upper rim of the fruit cup—that is, if the half section of the fruit should be of extraordinary size, then the entire main frame 608 will rise vertically relative to the pitter carriage 600 in the frame plate guideways, the springs 622 and 624 in this action taking the weight of the frame off the fruit face, the slots 740 and 742 between the actuating arms 736 and 738 and the rack 750 permitting this rise of the main frame. At this time the pitters are in an outwardly swung position, and the sleeves 728 and 730 are pressed together by the spring 684. On preliminary downward movement of the rack 750, the arms 736 and 738 first swing the blades inwardly across the surface of the fruit, the points 787 cutting slightly thereinto until these points strike the periphery of the pit. During this movement the pitter blades have swung about the individual axes 678 and 698. When the blades strike the periphery of the pit at the cut face of the fruit, the blades then swing or pivot about the common axis 656 of the coaxial shafts 656 and 664. If, during the swinging of the pitter blades about the separate axes 678 and 698 which are relatively remote from the cut face of the half fruit, the pit should be off center of the fruit, and one blade only contacts the pit, the other blade still approaching the pit, the approaching blade will continue its inward pit-locating motion until it also contacts the marginal edge of the pit. Thereafter, the blades striking the pit, the blades will then swing simultaneously about the common axis 656, thereby swinging the blades downwardly arcuately under the pit, the blades tending to follow a true arc of a circle, the center of which is the axis 656 and the radius of which is the distance from the axis 656 and the underside of the pit wall.

During the movement of the pitter blades from afar up to and around the pit for approximately the first one-third of the distance under the pit or somewhat less than the first one-third, the slotted arms 700 and 706 see Figures 47 to 51 of Patent 2,280,813 are out of contact with the rollers 652 and 654; but from the one-third distance on, these arms 700 and 706, due to their eccentric shape, will have their lower rounded bottom portions contact the upper surface of these rollers and will therefore be prevented from dropping and will compel the pitting blades to swing in an arc of a true circle, which will keep the pitting blades up against the under surface of the pit instead of digging down deeply into the flesh of the fruit beneath the pit. In short, these supporting rollers compel the pitting blades to make a shallow cut, thus following the natural contour of the pit. In addition, due to the construction wherein the pivoted actuating arms 736 and 738 moving downwardly are pivoted to arms 732 and 734 disposed substantially at 90 degrees to the face of the pitter blades, these actuating arms 736 and 738 tend to cause the blades to swing in a true circular arc closely following the curvature of the under side of the pit.

*Pit retainer*

Means is provided in association with the pitting mechanism and with the apertured presser plate 770, for holding the half pit in the pit cavity of the half peach during and after the pitting operation so that after the peach has been pitted the severed pit will lie loosely and freely in the pit cavity in the normal relation it would occupy when unsevered therefrom. In order to carry out this function there is secured to the top stationary frame 12 of the machine, see Figures 1 and 5 of the present application, a depending arm 1050 which carries at its lowest extremity a stationary camming member 1052. In addition, the vertically reciprocating pitter head frame 600, see Figures 1 and 3, is provided with the bearings 1054 and 1056, see Figures 5 and 7, to receive the rotatably mounted shaft 1058. A lever 1060 is pinned to one end of the shaft as at 1062, see Figure 7, the upper end of which lever carries a roller 1064 which is acted upon by the camming surface 1052, hereinbefore described. Thus, as the pitting head 600 rises or lowers, the camming surface 1052 will impart, through the roller and lever, an oscillating motion to the shaft 1058. Pinned to the other end of the shaft 1058 is the pronged lever 1066, the pronged extremity of which contacts the underside of a disc 1068. Slidably mounted on the bracket 698, see Figures 3 and 5 of the present application, is a stem 1070 which has secured to its lower extremity the small pad 1080. The disc 1068 is secured to the upper extremity of the stem 1070. A spring 1082 surrounds the stem 1070 between the pad 1080 and the pitter head bracket 608. This spring produces an urge tending to push the pad 1080 downwardly onto the pit, especially when the pit has been severed from the fruit. However, due to the action of the camming surface 1052, the pad 1080 cannot contact the pit except at a predetermined time.

The operation of the device is as follows: during the downward travel of the pitting head 600, as hereinbefore described, the roller 1064 rolls down along the stationary cam surface 1052, but because this surface is parallel to the movement of the pitting head, no relative change in position between the pad 1080 and the pressure plate 772 is produced. That is, the pad 1080 stays in pressing contact with the cut face of the pit as shown in Figure 6. However, as soon as the pitting head has lowered to within about one inch of the pitting position, the roller 1064 strikes the lateral camming surface 1052. This causes the shaft 1058 to turn counterclockwise which in turn causes the fingers on the lever 1066 to lift the stem 1070 to the position shown in Figure 5 where the pad 1080 is lifted from pressing contact with the cut face of the pit. While the pad 1080 is held in this raised position above the pit as shown in Figure 5, the pitting blades go through their cutting stroke to sever the pit from the fruit as hereinbefore described. Since the pad 1080 is held upwardly in the clear during the pitting operation, the pad does not interfere with the operation of the pitting blades. However, while the pitting head is down in the pitting position in contact with the flesh of the half fruit, the pitting blades sever the pit and return to their open position as shown in Figure 7. The camming surface 1052 and the lever arrangement is such that as the pitting head 600 rises, the pad 1080 drops fast enough to contact the pit for a sufficient length of time to ensure that the pit will stay in the pit cavity. The final contact between the pit and the pad 1080 is shown in Figure 6. The spring 1082 produces the push on the pad 1080 which causes the pit to be retained in the pit cavity.

If desired, the mechanism is arranged such that just after the pitting blades 714 and 716 have started under the pit, the pitting head rises so that the fruit is lifted above the bottom of the cup, thereby causing the weight of the pitter blade assembly 662 to exert force or pressure on the flesh only of the half fruit at its cut face in a direction away from the pitter blades, thus effecting a close cut to the undersurface or peripheral curved wall of the pit. This action ensures the cutting of a minimum of flesh of the pit, whether the pit is large or small, and at the same time the pad 1080 carried by this pitter head will press downwardly upon the half pit to maintain it in the pit cavity.

The pitting blades

The preferred construction of the pitting blades 714 and 716 is shown clearly in the drawings, Figures 3 and 4, see Figures 36, 37 and 38 of Patent 2,280,813. These blades are drop forged from sheet metal. They include a straight, substantially rectangular portion 751 attached to the arms 710 and 712 of the pitter carrying sleeves 728 and 730 and are adapted to oscillate or swing in an arc toward and from the cut face of the half fruit. The main body 751 of each blade has integrally formed therewith a curved, relatively narrow blade member 753 curved laterally out of the plane of the body 751 and provided with an opening 755. The central portion of the curved cutting edge 757 is provided with a point located in the same plane of the curved portion 753 of the blade. The arcuate cutting edge 757 conforms somewhat to the elongated curvature of the peach pit when constructed for pitting peaches. The point 787 on the edge of the blade is desirable as it allows some portion of the blade to get down to the cut face of the fruit whereby to contact the edge of the pit without causing the main portion of the blade to mar the surface of the flesh during the pit locating operation. The opening 755 in the blade is provided to permit the maximum curvature of pit wall to pass or project therethrough during the pitting action, which eliminates tearing action which would otherwise occur if the blade were not apertured. A pit is wider than it is deep, and with a solid blade cutting would occur only part way and then the pit would be torn out, leaving a rough, jagged, unsightly cavity. This relief is due to the inner arcuate wall 759 forcing the pit upwardly away from the flesh of the fruit. It will be noted that each pitting blade during the actual pitting operation swings only approximately through one-fourth of an arc of a complete circle, the two blades finally meeting at the bottom of the pit to complete the severance of the half pit.

The function of the rollers 652 and 654 acting in conjunction with the slotted enlargements 704 and 709 on the rounded lower ends of arms 700 and 706 is to provide means for supporting the pitting knives after they have traversed part way along the under side of the half pit and thereby compelling the blades to follow the under side outline of the half pit. If the rollers were not present, after contacting the under side of the half pit and pivoting about the common axis 656 the pitting blades would tend to move downwardly into the flesh of the half fruit beneath the pit and would dig very deep cuts into the flesh, which would be wholly undesirable. By suitably shaping the arc of curvature of the portion 757, when the pitter blades have moved arcuately approximately one-third of the distance, and this length is preselected and may be changed by altering the shape of the portion 757, around the under surface of the half pit, the arms 700 and 706 by such time will have swung upwardly sufficiently so that the rounded cam-shaped portions forming the bottom portions of the arms 700 and 706 will have shifted to now rest upon the rollers, and from there on, during the subsequent swinging movement of the arms 700 and 706, these arms and hence the pitting blades will be confined to a circular movement which will closely follow the curvature of the under side of the half pit.

By reference to the drawings, it will be noted that when a half fruit is brought by the turret beneath the vertically shiftable pitting head, the pitting means 714 and 716 are positioned on opposite sides of the pit and that the pitting means moves about an axis substantially parallel with the longer or longitudinal axis of the pit, the blades conforming to the curvature of the pit that corresponds with this longitudinal axis. This is the preferred arrangement.

The half fruit-holding means

Except for the size and round shape of the cups to accommodate peaches in lieu of pears as illustrated in the prior filed applications of Mark Ewald and except for the absence of grooves and except for a greater shallowness in the depth of these cups, their construction and operation is identical to the cup structures disclosed in said prior mentioned Ewald applications.

As shown in Figure 6 of Patent 2,280,813, the turret disc 276 (see also Figures 1 and 2 of the present application) is provided with a plurality of radially extending spokes 770' uniting with a rim or web 772' forming an intermittently rotating spider. At equally spaced angular intervals about this spider the web is formed with a vertical countersink which is suitably bored and threaded to receive a bolt 774'. The shank 776 of a half fruit holding means is removably mounted in each one of these countersinks on the web. In the present instance six half fruit holding means are so mounted. Each half fruit holding means preferably comprises a cup formed of two relatively hinged halves. One of the halves is stationary and is formed with the depending rigid shank 776' heretofore described as bolted to the turret web whereby to carry each complete cup intermittently to and past each operating station. The other half 780 of each cup is formed with rigid furcations 782 and 784 (Figures 3, 5 and 10 of the present application and Figures 67 and 68 of Patent 2,280,813). These furcations and the shank 776 of cup half 778 are provided with registering bores to receive a pivot pin 786, thereby pivotally holding the cup halves together in closed position or permitting the cup half 780 to swing outwardly from the fixed cup half 778.

In order to cause an opening movement of the cup half 780, as shown in Figure 12 of the present application, it is provided with a rigid depending arm 788, formed with a lateral offset 790 carrying a roller 792 which is adapted to be contacted by a lug 794' on the bottom of an arm 796' on the peeler head (see Figure 9 of the present application and also see Figure 68 of Patent 2,280,813), soon to be described.

The processed half fruit discharge

The fruit discharge mechanism is mounted on the vertically reciprocable frame that also carries the peeling and pitting heads and therefore operates in timed relation thereto. This discharge mechanism comprises a horizontal plate or support 930, see Figure 8 of the present application, having spaced upstanding bosses 932 and 934 through which pass vertical rods 936 and 938. Rod 936 has a bevel gear 940 fixed to its bottom, and rod 938 has a yoke 939 fixed to its bottom. A cross saddle or frame 942 is pivotally carried by the yoke 939 at one end and has a bearing 941 rotatably mounted on the rod 936 at the other end above the bevel gear 940. Cross saddle 942 has spaced depending arms 944 and 946 forming spaced bearings on which are mounted the opposite ends of shaft 948 carrying the half fruit discharge means. In the present instance this is shown as a paddle 950. One end of shaft 948 carries a bevel gear 952 meshing with bevel gear 940 whereby to oscillate the paddle 950 by means of the actuation of the shaft 948. The discharge paddle is preferably of the general type disclosed in certain of the prior Mark Ewald patents. It is formed with flat, spaced apart members 954 and 956 forming therebetween a recess generally conforming to and slightly larger in cross section than the maximum diameter of the half pits of fruit being pitted. In addition, the upper surface of this paddle has pivoted thereto at 958 a flat kick-off member 960 which has an upstanding lug 962 above the pivoted part 958, as shown in Figure 57 of Patent 2,280,813 and also in Figure 8 of the present application. This upstanding lug 962 is actuated by an arm 964 pivoted at 967 to that bearing 934 on the plate 930 through which rod 938 passes. The upper end 966 of pivoted arm 964 carries a roller 970 working in a cam slot 972 mounted on the upright corner frame 8 between the discharge station and the scavenging station. The rods 936 and 938 above their bearings on the plate 930 are provided with set collars 974 and 976 to prevent the yoke dropping below a predetermined point when the plate 930 is raised. These set collars are vertically adjustable. The upper ends of each rod are provided with caps 978 and 980, and between each cap and the upper portion of the rod bearing is located a coiled spring 981, 983 for normally resiliently supporting the saddle on the plate 930 so that when the plate is lowered the discharge paddle will be resiliently positioned upon the upper face of the half fruit in the fruit holder. Rod 936 is provided with a gear 982 and a keyway which receives a key pinned in the gear 982. This allows the rod 936 to slide freely through the gear and also provides a medium for transferring power from the gear to the rod 936, the rod 936 being disposed in a bearing between the bearing 932 for this rod and a yoke 974 against which the coiled spring 981 presses. This gear 982 meshes with a toothed sector 988 pivotally mounted on the plate 930. The sector 988 is reciprocated by a rod 990 in turn actuated by an arm 992 fixed to the upper end of oscillatable vertical shaft 36, see Fig. 2.

During the operation of the half fruit discharging mechanism, just described, the paddle mechanism will serve to invert the pitted and peeled half fruit and kick it from the cup. However, during the inversion of the half fruit the severed pit, which has remained in the pit cavity of the half fruit up to this time, will be dumped into the fruit cup along with any peeling that has been retained therein during the peeling operation. It will be seen that by reason of the fact that the fruit paddle 954 is provided with an opening, and this opening being larger than the half pit, that the half pit will be discharged through this opening in the paddle into the cup, as shown in the drawings.

The pit scavenging means

After the processed half peach, properly peeled and pitted is discharged from the machine by means of the fruit discharger or ejector, leaving the pit and the peel in the cup as hereinbefore described, the cups then move with an intermittent motion to the peel and pit scavenging station where means is provided for discharging the peel and the pit from the cup, and in such a manner as to permit the turret subsequently to convey the scavenged cup to the next station in the cycle, to wit, the half fruit receiving station. To this end the shaft 60 carries intermediate its ends mechanism for operating the scavenging mechanism. As shown in Figures 12 to 17 inclusive of the present application, this comprises a gear sector 994 pinned to the shaft 60. Shaft 60 has pinned thereto a driving collar 1003 which has a laterally projecting lug 1005 detachably insertable between two spaced driving shoulders 1007 on a friction collar 1004 hereinafter referred to. This sector has bevelled teeth 996 on its vertical side face meshing with teeth on a bevelled pinion 998 fixed on a cross shaft 1000 mounted on a bearing 1002 carrying a friction hub 1006. Shaft 60 oscillates through approximately 148 degrees. A friction collar 1004 is compressed about the hub 1006 by a spring 1008. This hub 1006 is rotatably mounted on shaft 60, while the segment gear 994, is keyed to shaft 60. Ninety-nine degrees of the 148 degrees of turning are used to turn the bearing with the shaft 60 to expel the peel. Shoulder 1010 on bearing 1002 then contacts a stop screw 1012. A continued rotation of shaft 60 causes the segment gear keyed to this shaft to turn the pinion 998, which now rotates the scavenger blade 1014 through 189 degrees. The friction band 1004 merely sets up a resistance so that the assembly will turn with the shaft until the stop shoulder 1010 contacts the stop 1012. On the reverse turning of shaft 60, the shoulder 1011 contacts the stop 1013. This is the position at which the peel and pit are taken out of the cup.

No description is given of the fruit receiving and discharging chute, since it is not essential to the description of the present invention claimed herein.

At the pitting station, when the slide 814 descends, the pitting head is brought downwardly, somewhat in the position shown in Fig. 3. The pitter gauge plates 770 and 772 are suspended by means of the slotted members 780 and 782, which in turn are slidably mounted on the stems 790 and 792. The members 780 and 782 have their adjusting screws 806 and 808 for the purpose of setting the gauge plates to a position where the points 787 of the pitting blades will extend below the peach contacting surface of the gauge plates a sufficient distance to insure contact with the pit as the blades close in to start the severing of the pit from the flesh of the fruit.

The blades must be opened a predetermined distance so that the cutting edges will always be away from the pit as the blades come down to sever the pit from the peach. The pitting blades, after contacting the cut flesh of the half fruit, will drag across the face of the fruit until they come to the pit before any cutting action of the blades takes place. The cutting blades are first opened by the upward movement of the arms 736 and 738. The predetermined distance of opening is governed by the slots 704 and 709. This is because the arms are parts of the sleeves 728 and 730 which carry the pitting blades, and since the ends of the slots come in contact with the shafts 656 and 664, no further outward movement of the pitting blades can take place. Upon descent of this pitter head, the gauge plate sections 662 are moved downwardly until they contact the cut face of the half peach, the cut face projecting above the upper rim of the cup sections. This downward movement through the proper adjustments heretofore described adjustably positions the points 787 slightly into the cut face of the half fruit on each side of the pit and in spaced relation therefrom.

Operation

Upon the actuation of the pitting arm 736, as hereinbefore described in detail, each pitter blade will swing about its individual pivotal axis 678 and 698, as shown in Figure 7, thereby causing the blades to drag or move laterally across the cut face of the half fruit, the points digging only slightly into the cut face of the half fruit. To insure that the pitter blades preliminarily swing about their own individual pivots 678 and 698, the bevel gears 668, 679, and 686, together with spring 684 operate as follows: the spring 684 sets up on the shaft 640 and the pinion 679 keyed thereto a torsional urge which tends to turn the pinion. This turning is transferred through the pinion to the two intermeshing bevel gears 668 and 686. Bevel gear 686 is keyed to its sleeve 692 which is a part of the lever 694. This arrangement transmits the turning urge from the spring 684 to the lever 694, thereby creating a resistance to turning of the arm 694 about the fulcrum through the shaft 664. Bevel gear 668 creates a resistance to the turning of the arm 674 in the same manner but in the opposite direction. Since resistance has been set up to keep the arms 674 and 694 from turning about the fulcrum through shafts 664 and 656, the sleeves 728 and 730 will turn about the shafts 678 and 698, see Fig. 4, until the cutting edges of the pitting blades engage the pit. Now, since the pit offers a greater resistance than the spring urge from spring 684, the urge is overcome and the arms 674 and 694 turn about the fulcrum through shafts 664 and 656, thereby compelling the pitting blades to complete the cut around and under the pit. The bevel gears also function to compel the cutting blades to move about the pit at a uniform rate of speed whereby to insure a uniform cavity when the pit has been removed, by acting as stabilizers between the two arms. Since the gears 686 and 668 are meshed with the pinion 679, and since the arms 674 and 694 are keyed to the stems of these gears, the arms 674 and 694 must turn uniformly together about the common fulcrum through shaft 664.

The pit locating movement of each pitting blade brings each blade into contact with the outer curved wall of the pit at a point slightly below the cut face of the pit. At this time the blades form fulcrum points which thereafter causes each blade not to swing about its axis 678 and 698 but to swing about a common axis 656, which axis instead of being remote from the cut face of the half peach, as are the axes 678 and 698, is relatively close to the cut face of the half fruit. At this point the slot in each arm 700, 706 will shift with respect to the axial portion 656 so that as the end of each slot is reached by each respective shaft, the bottom portions of the arms 700 and 706 will have contacted the upper surfaces of the rollers 652 and 654. In other words, this contacting action takes place when the pitter blades have moved slightly less than one-third around the under surface of the pit. At this instant it is important that the pitter blades be supported so that they will swing in true circles about the axis 656 and snugly and closely follow the under wall of the pit until they meet at a point centrally of the under surface of the pit, thereby in their overlapping meeting completely severing the pit; for if these arms were to drop down they would be permitted to open, whereas it is necessary to keep them together to complete the severance of the under side of the half pit along the line closely following the outline of the pit. By inspection of Figs. 3-4 it will be noted that through the bevel gearing and the action of the spring 684, the spring serves to keep the arms 700 and 706 substantially together vertically or in their uppermost position and provides sufficient spring resistance, greater than the drag of the pitter blades across the face of the fruit flesh until the time of contact of the blades with the pit, which offering greater resistance to the further movement of the pitter blades, the spring resistance is now overcome and the pit forming the stopping movement of the blades, the blades will then start down through the flesh, which causes the arms now to swing about the central or common axis 656 instead of their own separate axes 678 and 698 as heretofore. The bevel gears 668 and 679 and 686 cause the blades to move uniformly through the cutting stroke; that is, they tend to prevent one blade running ahead of the other in the cutting, all as hereinbefore described.

In the preferred embodiment of the construction of the present application, the peach is raised slightly out of the cup after the pitting blades have started cutting under the pit, which action creates a downward pressure or force on the cut face of the peach by the presser or gauge plates equal in intensity to the weight of these plates 662 and the weight of the end castings 780 and 784 secured thereto. While this lifting action at this point in the cutting operation is not wholly necessary in so far as the actual severing of the pit is concerned, it does tend to eliminate marring or bruising of the fruit during the pitting operation.

During a portion of the pitting operation, and thereafter, the pad 1030 is maintained in contact with the severed pit lying in the pit cavity of the half peach held by the cup.

Upon the completion of the pitting operation the pitter head moves up in synchronized relation, the cup carrying the half fruit, peeled and pitted, and the half peach overlying the loose peeling. Upon intermittent succeeding counterclockwise rotation of the cup-carrying turret, the cup carrying this pitted and peeled half peach is next brought under the half peach extractor and ejector, as shown in Fig. 2. Upon the next succeeding downward movement of the vertically reciprocating main slide, the discharge and extractor mechanism carried thereby, the details of which are shown in Fig. 8, is brought down upon the cut face of the half fruit. The paddle mechanism is first brought into the position shown in Fig. 10. At this time the paddle mechanism is turned to the position approximately shown in Fig. 11, which as shown is not completely inverted but is slightly at an inclination. This action inverts the half fruit. During this turning of the half fruit by the paddle mechanism, the rubber lip upon the fruit discharging chute 1018 slightly overlies the inner wall of the cup directly in the path of the loose peeling so as to prevent the peeling being turned out of the cup during this inversion. The direction of turning is in such a manner that the rubber lip prevents dislodgment of the peeling in the cup while permitting the turning.

As the paddle mechanism reaches the inverted position shown in Fig. 11, the cam 972 will actuate the striking finger 964 whereby forcibly to flip the discharge ejector 960 so as to kick the fruit laterally into the fruit chute 1018 and at this time simultaneously the fruit discharge chute is given an oscillatory movement by the shaft 68 to throw the chute forwardly to project the processed half peach completely out of the machine to a desired point, the ejection being sufficiently gentle so as not to injure the fruit, but causing it to be ejected from the machine.

During the inversion of the discharge ejector 960 the pit, which has been in the pit cavity, is passed through the opening in the paddle 954 to depress the pit in the cavity, as hereinbefore stated.

The vertical movement of the paddle carriage in nowise interferes with the oscillatory movement of the fruit chute, since the latter is mounted laterally thereof. Upon the completion of this ejection of the processed half fruit the paddle mechanism rises with the main sliding head heretofore described and since the fruit chute has carried the flexible lip from the fruit cup, this cup upon the next intermittent counter-clockwise movement of the main feed turret, and with the loose peeling and the pit therein, will next move to the scavenging station. The cup, with the loose peeling therein, is positioned under the scavenging mechanism; the scavenging mechanism is then swung downwardly to horizontal position and is thence turned to scavenge the peeling from the cup in the manner hereinbefore described. Subsequent to this scavenging movement the scavenging blade is then moved away from the cup and upon the next successive intermittent counter-clockwise movement of the cup carrying turret this cup will be carried to the next station, which as shown in Fig. 2 brings the cup to the first of the stations on one side of the spreader plates.

In this construction the opening of the pitter blades after the severance of the pit is delayed to such a point as to release the pit to cause the pit to drop between the cups as the turret turns to place a succeeding peach in position for pitting.

The mechanism for raising the carriage that vertically shifts the pitting head carrying the pitting blades is the same mechanism that raises the slide 814. The cam race 804' is so designed that the slide 814 is maintained in downward position sufficiently long for the peeling knife, the fruit extractor and the peeling scavenger to have completed their work before the said slide 814 starts to raise. In certain constructions the cam race 804 is constructed and arranged so that after the slide has moved to position the pitting head to start the pitting cut as hereinbefore described, and during which time the pitting knives have begun their cuts in approaching directions around the under side of the pit, the slide is raised about 5/8 inch and then held there until the pitting blades have finished their cut, at which time the slide is then raised the full amount to clear the turret in its next intermittent turning movement. This raising of the pitter head slightly out of the cup after the pitting blades have started cutting under the pit causes the creation of a downward pressure or force on the peach by the presser or gauge plate as hereinbefore described.

In another design or construction of the cam race 804', the race is formed so as to make one gradual rise of the slide in its upward movement, which upward movement includes a portion of the finishing operation of the pitting cut. By this modification in the operation of the machine, a much smoother running machine is provided and at the same time there is secured the same effect of causing the pitting blades, as the pitting head rises, to tend bodily to lift the pit, due to the fact that the pitting knives have moved around and beneath the curved walls of the pit while at the same time the presser or gauge plate is still, by its weight, pressing downwardly solely on the flesh of the half peach and not on the pit, which as hereinbefore described causes the pitting knives more closely to follow the curved under walls of the pit so as to cut the minimum of flesh from the half peach during the pitting operation. The pitting mechanism is claimed in our application, Serial No. 293,252, filed September 2, 1939, which matured as Patent No. 2,216,165, granted October 1, 1940, and the claims to the stem cavity trimming and peeling mechanisms and method are contained in our application, Serial No. 293,253, filed September 2, 1939, which matured as Patent No. 2,335,849 of December 7, 1943.

We claim:

1. In a peach pitting machine, the combination of a support, a fruit holder mounted thereon adapted to hold a half fruit with its cut face exposed and with the flesh of the half peach carrying a pit section unsevered from the flesh thereof, pitting means adapted to cut around the flesh of the half peach to sever the pit therefrom, means for producing relative motion between the pitting means, the fruit holder and cut face of the half fruit whereby the pitting means and the fruit are relatively brought into pitting position and thereafter the pitting means and the cut face of the half fruit are relatively positioned remote from one another, means for actuating the pitting means while said pitting means is in pitting position, pit retaining means operable upon the pit to maintain the severed pit in the pit cavity after severance of the pit and during the relative displacement of the pitting means and the face of the half fruit and means for maintaining the pit retaining means out of pressing contact with the pit prior to initiation of the pitting operation.

2. In a pitting mechanism for pitting half peaches, the combination of a fruit holder adapted to hold a half fruit having a pit section unsevered from the flesh of the half fruit, pitting means, means to produce relative motion between the pitting means and the half fruit holder to cause the pitting means to be positioned adjacent the cut face of the half fruit and thereafter to cause relative displacement between the cut face or the half fruit and the pitting means, means for actuating the pitting means when in pitting position adjacent the cut face of the half fruit to sever the pit from the flesh of the half fruit, means contacting the pit section for preventing the displacement of the pit section from the pit cavity during the relative displacement of the pitting means and the cut face of the half fruit and mechanism maintaining said last named contacting means out of pressing contact with said pit as said pitting means is relatively approaching the half fruit holder.

3. In a pitting device, the combination of a support, a fruit holder thereon adapted to hold a half fruit with its cut face exposed and carrying a pit section unsevered from the flesh of the half fruit, pitting means including an apertured plate, means for producing relative movement between the fruit holder and the pitting means and apertured plate to cause the apertured plate to be placed into contact with the cut face of the half fruit with the aperture thereof registering with and spaced from the pit of the half fruit, means for operating the pitting means through the aperture of the plate to cause the pitting means to sever the pit from the flesh of the half fruit, means for causing a relative displacement between the pitting means and the cut face of the half fruit, and pit retaining means operating through the aperture of the plate and mechanism for actuating said pit retaining means to cause it to contact the pit section for holding the pit section in the pit cavity during the relative displacement of the pitting means and the cut face of the half fruit.

4. In a pitting device, the combination of a support, a fruit holder thereon adapted to hold a half fruit with its cut face exposed and carrying a pit section unsevered from the flesh of the half fruit, pitting means including an apertured plate, means for producing relative movement between the fruit holder and the pitting means and apertured plate to cause the apertured plate to be placed into contact with the cut face of the half fruit with the aperture thereof registering with and spaced from the pit of the half fruit, means for operating the pitting means through the aperture of the plate to cause the pitting means to sever the pit from the flesh of the half fruit, means for causing a relative displacement between the pitting means and the cut face of the half fruit, means operating through the aperture of the plate to contact the pit section for holding the pit section in the pit cavity during the relative displacement of the pitting means and the cut face of the half fruit, said means comprising a pad and resilient means carried by the pitting mechanism for pressing said pad into contact with the pit surface.

5. A de-seeding device for half fruit comprising a support, means for holding a half fruit with its cut face exposed, seed severing means operable upon the cut face of the half fruit to sever the seed section therefrom, means for producing relative displacement between the seed severing means and the cut face of the half fruit after the severing operation, means to press upon the severed seed section after the same has been severed for retaining the same in situ and means for holding said pit retaining means out of pit pressing engagement until the initiation of the pitting operation.

6. In combination, means for holding a half fruit with the cut surface exposed, seed section severing means, mechanism for producing a relative movement between the seed section severing means and the fruit holder for placing the severing means and the cut face of the half fruit adjacent one another, seed holding means associated with the severing means, means for maintaining the seed holding means remote from the cut face of the half fruit during the seed severing operation, said mechanism thereafter causing relative displacement of the severing means and the cut face of the half fruit relatively to separate them, and means actuated during their relative movement of separation for causing the seed holding means to contact the severed seed to hold the same in substantially normal seed position whereby to maintain the seed in the seed cavity of the half fruit.

7. In a device of the class described, in combination with a support, a fruit cup mounted thereon adapted to hold a half fruit with its cut face exposed, a pitter head adapted to move toward and away from the cut face of the half fruit, pitting means carried by the pitter head, means for positioning the pitter head relatively close to the cut face of the half fruit and then away from the cut face of the half fruit, means for actuating the pitting means when the pitting head is adjacent the cut face of the half fruit for severing the pit from the half fruit, pit holding means carried by the pitter head, means for positioning the pit holding means remotely from the pit during the pit severing operation, and means actuated upon movement of the pitting means away from the cut face of the half fruit for positioning the pit holding means into contact with the pit whereby to prevent the pit from displacement from the pit cavity.

8. In a device of the class described, in combination with a support, a fruit cup mounted thereon adapted to hold a half fruit with its cut face exposed, a pitter head adapted to move toward and away from the cut face of the half fruit, pitting means carried by the pitter head, means for positioning the pitter head relatively close to the cut face of the half fruit and then away from the cut face of the half fruit, means for actuating the pitting means when the pitting head is adjacent the cut face of the half fruit for severing the pit from the half fruit, pit holding means carried by the pitter head, means for positioning the pit holding means remotely from the pit during the pit severing operation, and means actuated upon movement of the pitting means away from the cut face of the half fruit for positioning the pit holding means into contact with the pit whereby to prevent the pit from displacement from the pit cavity, said means comprising a stem shiftably mounted on the pitter head, resilient means normally projecting the stem toward the cut face of the half fruit, and cam means operable on the stem in synchronism with the operation of the pitting mechanism for mechanically actuating said stem whereby to maintain said pit holding means away from the pitting zone during the pitting operation and also to cause said spring to project said pit holding means into contact with the severed pit to hold the pit in the pit cavity after pit severance.

9. The herein described method which comprises stationarily holding a half peach in a cup with its cut face exposed and with the internal walls of the cup supporting the curved external surfaces of the half peach, severing the pit section from the flesh of the half peach at the cut face while said half peach is so supported, pressing upon the severed pit section to hold it in the pit cavity while withdrawing the severing means from the cut face of the half fruit, thereafter inverting the pitted half peach in and relatively to the cup to discharge the half peach from the cup and for discharging the severed pit from the pit cavity into the cup.

10. In a device of the class described, means for holding a half peach with its cut face exposed, pitting means positionable adjacent the cut face of the half fruit for severing the pit section therefrom, means for causing relative displacement between the pitting means and the cut face of the half fruit after severance of the pit, means operable during said displacement for maintaining the severed pit in the pit cavity, means for thereafter inverting the pitted half fruit in its fruit holder and for discharging the half fruit from its fruit holder and for simultaneously discharging the pit from the pit cavity into the fruit holder.

11. In a device of the class described, means for holding a half peach with its cut face exposed, means positionable adjacent the cut face of the half fruit for severing the pit section therefrom, means for causing relative displacement between the pitting means and the cut face of the half fruit after severance of the pit, means for maintaining the severed pit in the pit cavity, means for thereafter inverting the pitted half fruit in its fruit holder and discharging the half fruit from its fruit holder and for simultaneously discharging the pit from the pit cavity into the fruit holder, and means for thereafter scavenging the pit from the fruit holder.

12. In a fruit pitting machine, the combination of means for holding a half peach with its cut face exposed, a pair of pitting cutters adapted to be positioned on opposite sides of the pit at the cut face of the half fruit to follow substantially the border of the pit to sever the flesh therefrom, means for causing a relative separating movement between the half fruit held in the fruit holder and the pitting means, and means operable between the pitting blades for pressing upon the severed face of the pit to maintain it in the pit cavity.

13. In a peach pitting machine the combination of means for holding a half peach with its cut face exposed, pitting means for severing the pit section from the flesh of the half peach at the cut face while said half peach is so supported, means for operating the pitting means and means for relatively displacing the pitting means and the holding means during operation of the pitting means and means for pressing upon the exposed cut face of the pit section only during such relative displacement to hold the pit section in the pit cavity.

14. In a device of the class described, means for holding a half peach with its cut face exposed, pitting means positionable adjacent the cut face of the half fruit for severing the pit section therefrom, means for actuating the pitting means to sever the pit section including means for pressing on the cut flesh only of the half fruit during pit severance, means for causing relative displacement between the pitting means and the cut face of the half fruit after severance of the pit and including release of the pressure on the cut face of the half fruit, and means operable on the cut face of the half fruit only after said pit severance for maintaining the severed pit in the pit cavity.

15. In a peach pitting machine the combination of a fruit holder having internally curved walls adapted to support the curved surfaces of a half peach with the cut face of the half peach exposed, pit severing means, fruit retaining means including spaced portions to contact the fleshy surfaces only of the cut face of the half fruit on opposite sides of but spaced from the pit section, means for relatively moving said fruit holding means and said pit severing means to cause said fruit retaining means to contact the cut flesh only of the half fruit and to cause the severing means to be positioned relatively close to the cut face of the half fruit so supported in said fruit holder or to position the severing means and the fruit retaining means relatively remote from the cut face of the half fruit so supported in the fruit holder, means for operating the pit severing means when the pit severing means is positioned adjacent the fruit holder and when the fruit retaining means is pressing against the flesh only of the cut face of the half fruit for cutting through the flesh of the half fruit at the cut face of the half fruit around the margin of the pit to sever the pit, and a separate pit section holding means shiftable with and relatively to said pit severing means and also shiftable with and relatively to said fruit retaining means to contact the pit section only during relative separation of the pit severing means and the fruit holder for holding the severed pit section in the pit cavity.

16. In a peach pitting machine, the combination of a fruit holder having internally curved walls adapted to support the curved surfaces of a half peach with the cut face of the half peach exposed, pit severing means including spaced fruit holding means adapted to contact the surfaces of the cut face of the half fruit on opposite sides of but spaced from the pit section, said severing means being shiftable relatively to the fruit holder and adapted to be positioned relatively close to the fruit holder and relatively remote from the fruit holder, means for operating the pit severing means in said space between said spaced fruit holding means when the pit severing means is positioned adjacent the cut face of the half fruit so supported in the fruit holder for cutting through the flesh of the half fruit at the cut face of the half fruit around the margin of the pit to sever the pit, resiliently operated pit retaining means having a pit contacting member to contact solely the pit section and retain it in the pit cavity and automatically operated means for shifting the resiliently operated pit retaining means for maintaining the pit contacting member from contact with the severed pit section during a portion of the pit severing operation.

17. In a device of the class described, in combination with a fruit holder having internal walls adapted to support the curved surfaces of a half peach leaving the cut face of the half peach exposed, a pitting head, pit severing means mounted on the pitting head, means for producing relative approaching and relative receding movement between the pitting head and the fruit holder for positioning the pit severing means adjacent the cut face of the half fruit or alternatively for relatively separating the pit severing means and cut face of the half fruit, means for operating the pit severing means to cause the same to cut through the flesh of the cut face of the half fruit around the pit when the pit severing means is positioned adjacent the cut face of the half fruit, additional fruit holding means operable to contact the cut flesh only of the half fruit during the pit severing to hold the half peach in the fruit holder, means mounted on the pitter head and normally pressed into contact with only the pit section of the half fruit to maintain the severed pit section in the pit cavity after the pit severing operation and during the relative separation movement between the pit severing means and the fruit holder, and automatically operated means operated by the movement of the pitter head for removing the pit holding means from contact with the pit section except at a predetermined period of operation of the pit severing mechanism.

18. In a fruit pitting machine, the combination of means for holding a half peach with its cut face exposed, means for contacting the flesh only of the cut face of the half fruit on opposite sides of and spaced from the pit section of the half fruit, means for pressing said contacting means against the flesh of the cut face of the half fruit during the pit severing operation, means for severing the half pit from the flesh of the peach at the cut face of the half fruit, means for causing a relative displacement between the half fruit held in the fruit holder and the pitting means, and means shiftable relatively to said cut face contacting means for pressing upon the face of the pit section after the pitting operation to maintain the severed pit in the pit cavity during relative separation of the pitting means and the half fruit held in the fruit holder.

19. In a peach pitting machine, the combination of fruit holding means adapted to support the curved surfaces of a half fruit with the cut face of the half fruit exposed, fruit retaining means providing spaced portions adapted to contact the fleshy portions only of the cut face of the half fruit on opposite sides of the pit section while said half peach is thus held in the fruit holder, pit section severing means operable between said spaced portions and movable to cut through the flesh of the cut face of the half fruit around the margin of the pit section to sever the pit section while said half fruit is so supported and retained by said fruit retaining means in said fruit holding means, means for relatively separating the fruit holding means and the pitting means for removing the pit severing means from the cut face of the half fruit, and means normally maintained out of contact with said pit during pitting and operable to contact the cut face of the severed pit section to hold the severed pit section in the pit cavity during the removal of the pit severing means after pitting.

20. The combination of means for holding a half peach about its curved walls and with the cut face of the half peach exposed, additional half fruit holding means cooperating with the fruit holding means and to contact a fleshy portion of the cut face of the half fruit during the pit severing operation for maintaining the half fruit in the holding means, pit severing means movable through the flesh of the half fruit adjacent the marginal surfaces of the pit section to sever the same from the half fruit, additional means positioned outwardly of the cut face of the half fruit while held in the first mentioned fruit holding means and shaped to contact solely the face of the pit section and means operable while said half fruit is held by at least one of said fruit holding means for positively actuating said additional means to press the same against the pit in the pit cavity for maintaining the pit section in the pit cavity upon relative displacement of the pit severing means and the cut face of the half fruit while supported in the fruit holding means, said last mentioned pit holding means being resiliently pressed into contact with the cut face of the pit section.

21. The combination of means for holding a half peach about its curved walls and with the cut face of the half peach exposed, additional half fruit holding means cooperating with the fruit holding means and having spaced portions to contact the fleshy portions spaced from the cut face of the half fruit during the pit severing operation for maintaining the half fruit in the holding means, pit severing means operating between the spaced portions of said additional half fruit holding means for severing the flesh of the half fruit at the cut face thereof substantially around the margins of the pit section to sever the same from the half fruit, means for moving the pit severing means and additional half fruit holding means relatively to said first mentioned peach holding means and for actuating said pitting means when said pit severing means is adjacent the cut face of the half fruit, additional means positioned above the cut face of the half fruit and shaped to contact solely the face of the pit section and means for moving said pit contacting means through the spaced portions of said additional half fruit holding means into contact with the pit for maintaining the pit section in the pit cavity upon relative displacement of the pit severing means and the cut face of the half fruit while supported in the fruit holding means.

22. In a fruit pitting machine, the combination of means for holding a half peach with its cut face exposed, means for severing the half pit from the flesh of the peach at the cut face of the half fruit, means contacting solely the flesh of the cut face of the half fruit during the pit severing operation, and separately actuatable means to contact solely the cut face of the pit section for maintaining the severed pit section in the pit cavity, and means to move said separately actuatable pit contacting means out of contact with the pit during the pitting operation.

23. In a peach pitting device, the combination of a fruit holder having internal walls adapted to support the curved surface of a half peach leaving the cut face of the half peach exposed, pitting means, means for producing relative displacement between the fruit holding means and the pitting means for positioning the pitting means adjacent the cut face of the half fruit or positioning the pitting means relatively remote from the cut face of the half fruit, means for operating the pitting means to cause the same to cut through the flesh of the cut face of the half fruit around the pit when the pitting means is positioned adjacent the cut face of the half fruit, means contacting solely the flesh of the cut face of the half fruit during the pitting operation to maintain the half fruit in the fruit holding means during the pitting operation, and additional means shiftable relatively to the last mentioned means for contacting solely the cut face of the severed pit section to maintain the severed pit section in the pit cavity during relative displacement between the pitting means and the fruit holder while supporting the curved walls of the half fruit and with the cut face of the half fruit exposed.

24. In a fruit pitting machine, the combination of means for holding a half peach with its cut face exposed, means for severing the half pit from the flesh of the peach at the cut face of the so held half fruit, and means operable after severance of the pit to contact the face of the pit only for maintaining the severed pit in the pit cavity and means for maintaining said last named means out of contact with the pit during severance thereof.

25. In a peach pitting machine the combination of a movable carrier means providing a series of spaced apart fruit holders on said carrier, each adapted to receive and support a half fruit by contact with the curved surfaces of the half fruit leaving each half fruit with its cut face exposed, means forming a pitting station disposed relative to the path of travel of said series of fruit holders on said carrier, means forming a fruit discharge station spaced from the pitting station and disposed relative to the path of travel of the successive fruit holders on said carrier, means for moving said carrier to move said fruit holders each with a half fruit supported therein in the manner hereinbefore described successively past said pitting station and said fruit discharge station, pitting means at the pitting station, means for relatively moving the pitting means and each successive fruit holder when the same are in registration for bringing the pitting means into adjacency with the cut face of the half fruit in each successive fruit holder, means operable when each fruit holder and the pitting means are so positioned for severing the pit section of the half fruit, means operable after the pitting operation to contact the cut face of the pit section while in the pit cavity for maintaining each severed pit section in the pit cavity of each successive half fruit while so held in a fruit holder, means for thereafter removing said pit contacting means from contact with the fruit, and means at the fruit discharging station to contact the cut flesh at the cut face of the half fruit on opposite sides of and in spaced relation to the pit section while said half fruit is so supported in the fruit holding means with the cut face exposed, and means to operate said discharge means relative to said fruit holder for discharging the pitted half fruit from the fruit holder and for discharging the severed pit section into the fruit holder.

26. In a peach pitting machine, in combination with a turret supporting a series of spaced apart fruit holders each adapted to support the curved surfaces of a half fruit with the cut face of the half fruit exposed, a pit severing station including pit severing means disposed to register with the cut faces of half fruits as they are brought into registration with said pit severing station for positioning the pit severing means adjacent the cut face of the half fruit, means operable while said pitting means is so positioned for operating the same to cut through the flesh of the half fruit around the pit to sever the same, means for maintaining the severed pit section in the pit cavity of the pitted half fruit, means forming a fruit discharging station disposed in the path of travel of each of the successive fruit holders carrying a pitted half fruit, means at said discharge station for contacting the fleshy portions of the cut face of the successive pitted half fruits held in the fruit holders for discharging the pitted half fruit from the fruit holder and for discharging the severed pit section into said fruit holding means.

27. In a fruit pitting machine, the combination of a support, a fruit holder mounted thereon and adapted to hold a half fruit by contact with the curved surfaces of the half fruit, the cut face of the cut fruit facing outwardly thereof, a shiftable pitting head mounted on said support and carrying pit severing means, means comprising spaced members shiftably mounted on said pitting head and constructed and arranged upon shifting of the pitting head relatively to the cut face of the half fruit in the holder to engage the flesh only of the half fruit in the holder and in spaced relation with the margin of the pit, means for relatively shifting the head and the fruit holder for positioning the pit severing means and the spaced members adjacent the cut face of the half fruit and for pressing the members into contact with the flesh only of the half fruit and means for operating the pitting means to sever the pit and for thereafter relatively displacing the pit severing means and said members remotely from the cut face of the half fruit, and pit retaining means carried by said head and operable to press into contact with the pit after the pitting operation for maintaining said severed pit in the pit cavity during relative separation of the pit severing means and the half fruit and means for positively shifting said pit retaining means out of contact with the pit so that during at least a portion of the initial operation of the pitting means said pit retaining means will not interfere with the action of the pitting means in cutting into the flesh of the half fruit to sever the pit therefrom.

28. In a fruit pitting machine, the combination of means for holding a half peach with its cut face facing outwardly of the holding means, means for severing the half pit from the flesh of the peach at the cut face of the half fruit, means for causing a relative separating movement between the half fruit held in the fruit holder and the pitting means, pit retaining means, and means for maintaining the pit retaining means out of contact with the pit prior to and during an initial part of the pit severing operation of the pitting means and means for thereafter causing said pit retaining means to press upon the severed face of the pit only to maintain it in the pit cavity during and after the completion of the pitting operation.

29. The herein described method which comprises stationarily holding a half peach in a fruit holder with its cut face exposed, pressing on the flesh only of the cut face of the peach, severing the pit section from the flesh of the half peach at the cut face while said half peach is so supported and while maintaining pressure on the flesh only of the cut face of the peach, withdrawing the severing means from the cut face of the half peach and withdrawing pressure on the cut face of the half fruit and pressing upon the exposed cut face of the severed pit section only to hold it positioned within the pit cavity whereby to prevent the pit section from extending over the cut face of the peach where subsequent pressure thereon would mar the flesh of the peach, withdrawing the pressure from the previously positioned pit section, and thereafter pressing upon the flesh of the peach with the pit section remaining positioned in its cavity and inwardly of the pressed portion of the flesh of the peach, and thereafter separately discharging the half peach and pit section by relative movement between the pressed half peach and the cup.

30. In a peach pitting machine, the combination of means for holding a half peach with its cut face exposed, means for severing the half pit from the flesh of the peach at the cut face of the half peach, means spaced from the margin of the pit section for contacting solely the flesh of the cut face of the half fruit during the pit severing operation for holding the half peach in the peach holding means during the pitting operation, means for producing relative displacement between the pit severing means and the flesh contacting means and the fruit holding means for removing the severing means and flesh contacting means from the cut face of the half fruit after the pit severing action, and separate pit retaining means contactable with the cut face of the pit section only to retain it in the pit cavity upon relative separation of the fruit holding means and the severing means and flesh contacting means.

31. In a fruit pitting machine, the combination of means for holding a half peach with its cut face exposed, means for severing the half pit from the flesh of the peach at the cut face of the half fruit, additional half fruit holding means spaced from the margin of the pit section and contacting solely the flesh of the cut face of the half fruit during the pit severing operation, means for relatively moving the pit severing means and the half fruit and for pressing the additional fruit holding means into contact with the cut face of the half fruit while in the first holding means, means for actuating the severing means to pit the half fruit, means for producing relative separation between the pit severing means and the additional fruit holding means and the first mentioned fruit holding means to remove the severing means together with the additional fruit holding means from the cut face of the half fruit, and separate means shiftable relatively to said additional half fruit holding means to contact solely the cut face of the pit section after severance for maintaining the severed pit section in the pit cavity.

RAYMOND L. EWALD.
HENRY A. SKOG.

REFERENCES CITED

The following references are of record in the file of this patent:

UNITED STATES PATENTS

| Number | Name | Date |
|---|---|---|
| 1,389,795 | Thompson | Sept. 6, 1921 |
| 1,769,654 | Spencer | July 1, 1930 |
| 2,066,567 | Jepson | Jan. 5, 1937 |
| 2,210,910 | Ewald | Aug. 13, 1940 |
| 2,242,242 | Ewald | May 20, 1941 |
| 2,280,813 | Ewald et al. | Apr. 28, 1942 |
| 2,388,682 | Ewald et al. | Nov. 13, 1945 |

FOREIGN PATENTS

| Number | Country | Date |
|---|---|---|
| 6169/32 | Australia | Feb. 17, 1932 |